(12) United States Patent
Sugawara et al.

(10) Patent No.: US 7,581,465 B2
(45) Date of Patent: Sep. 1, 2009

(54) JOINT STRUCTURE OF ROBOT

(75) Inventors: Zenta Sugawara, Wako (JP); Hiroshi Matsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 988 days.

(21) Appl. No.: 10/532,113

(22) PCT Filed: Oct. 17, 2003

(86) PCT No.: PCT/JP03/13328

§ 371 (c)(1),
(2), (4) Date: Apr. 21, 2005

(87) PCT Pub. No.: WO2004/037499

PCT Pub. Date: May 6, 2004

(65) Prior Publication Data

US 2006/0015214 A1    Jan. 19, 2006

(30) Foreign Application Priority Data

Oct. 22, 2002   (JP) .............................. 2002-306880

(51) Int. Cl.
*B25J 17/00* (2006.01)
(52) U.S. Cl. .................................................. 74/490.05
(58) Field of Classification Search .............. 74/490.01, 74/490.03, 490.05; 294/99.1, 111; 901/15, 901/23, 27, 28, 36, 38; 623/57, 59; 414/1, 414/4
See application file for complete search history.

(56) References Cited

U.S. PATENT DOCUMENTS

| 1,397,654 | A | * | 11/1921 | Pringle et al. | ................. | 623/59 |
| 5,222,409 | A | * | 6/1993 | Dalakian | ................. | 74/479.01 |
| 6,481,309 | B2 | * | 11/2002 | Mitsuyoshi | ............... | 74/490.01 |

OTHER PUBLICATIONS

Japanese Office Action 2002-306880 dated Aug. 12, 2008 w/translation.

(Continued)

*Primary Examiner*—Vicky A Johnson
(74) *Attorney, Agent, or Firm*—Squire, Sanders & Dempsey L.L.P.

(57) ABSTRACT

In a robot of an elbow joint of a humanoid robot, a first main link and a second main link are connected through a first movable link and a second movable link, and the two movable links are arranged to cross. Specifically, in a quadrangle whose apices are formed by rotation axes A, B, C and D, when assuming that rotation axes diagonally opposed to each other are A and C, and B and D, the rotation axes A and C are connected through the first movable link and the rotation axes B and D are connected through the second movable link in such a manner that the first and second movable links are disposed to cross, and that the rotation axis A is driven by the actuator to drive the first movable link, such that the first and second main links are displaced relative to each other. In addition, the first movable link is rotatably connected to a first plate and a second plate through the rotation axis A, while the second movable link is rotatably connected to the first plate through the rotation axis B. With this, it becomes possible to increase the overall driven angle of the joint relative to the input, expand the range of motion of the joint in the bending direction, and also raise the critical value of the driven speed (i.e., rotational speed).

7 Claims, 21 Drawing Sheets

OTHER PUBLICATIONS

Microfilm of the specification and drawings annexed to the request of Japanese Utility Model Application No. 185599/1984 (Laid-Open No. 99496/1986), Jun. 25, 1986, p. 8, line 17 to p. 12, line 4.

Microfilm of the specification and drawings annexed to the request of Japanese Utility Model Application No. 159798/1986 (Laid-open No. 64489/1988), Apr. 28, 1988, p. 6, line 12 to p. 7, line 9.-.

* cited by examiner

FIG. 14
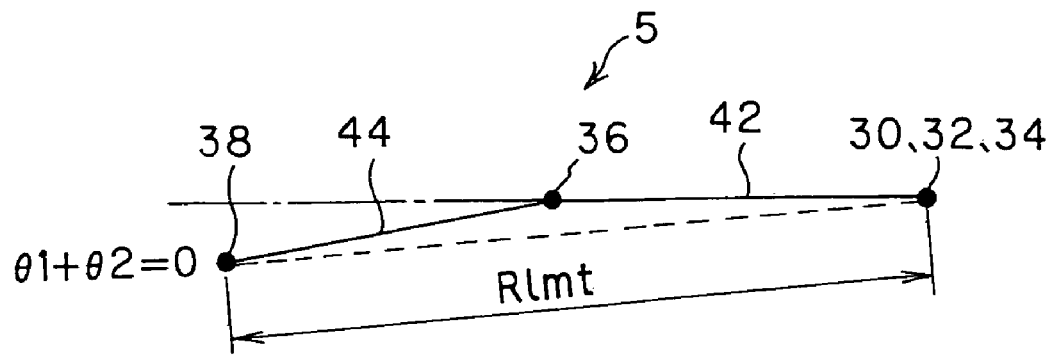
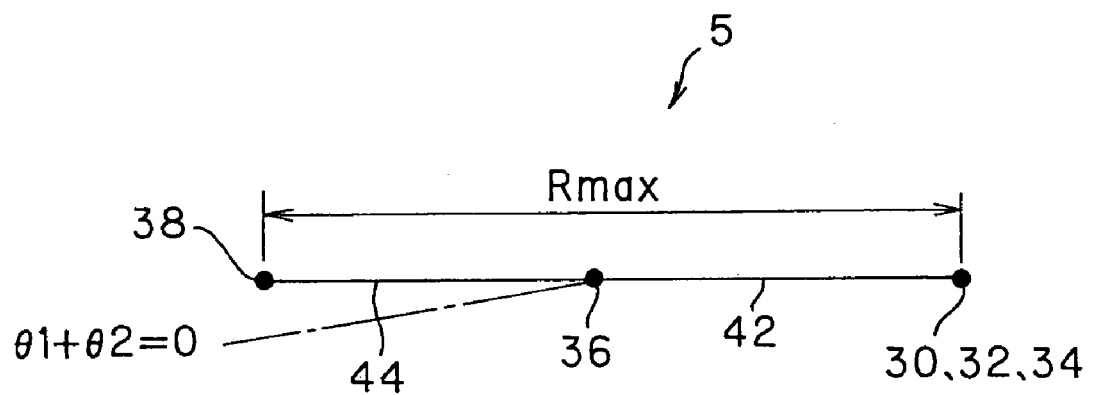
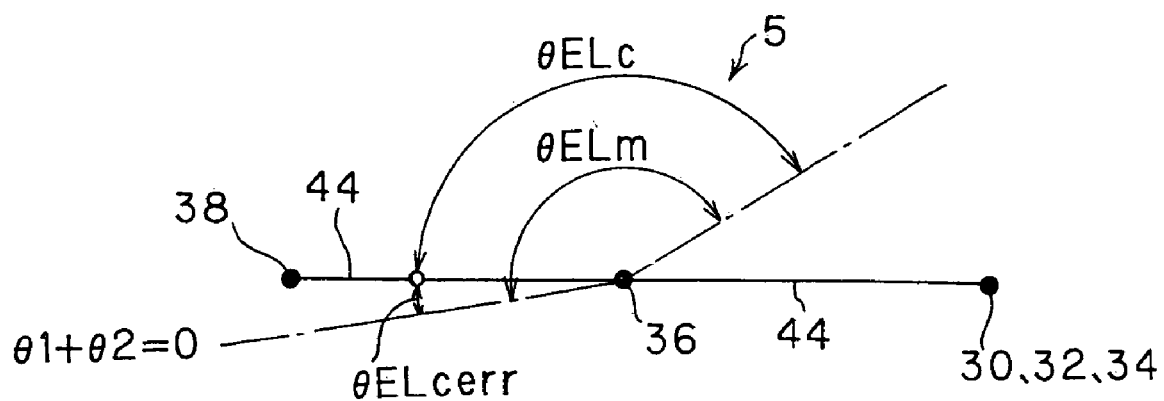

*Related Art*

US 7,581,465 B2

JOINT STRUCTURE OF ROBOT

TECHNICAL FIELD

This invention relates to a robot joint structure.

BACKGROUND ART

The prior art teaches a joint structure of an industrial robot in which an arm is interconnected through a parallel linkage having four or more links (see for example Japanese Laid-Open Patent Application No. Hei 10-296680 (paragraphs 0002, 0008 and 0012, and FIGS. 2, 3, 5 and 6).

A robot joint structure that interconnects links by a single axis is also known. From the viewpoint of safety and protection against dust, it is ordinarily preferable for a robot to have the outside of the links covered by covers so as not to expose the internal structure. A joint structure has therefore been proposed for a legged mobile robot, for example, in which links (e.g., a thigh link and a shank link) are interconnected by a single axis (i.e., the thigh link and shank link are directly connected without use of an intermediate linkage), the edge of the cover covering one link is formed to have a spherical surface centered on the single axis and the edge of the cover covering the other link is given a concave shape corresponding to the spherical surface, whereby no gap arises between the covers when the joint is moved (see Japanese Laid-Open Patent Application No. 2002-210682 (FIG. 4)).

In stationary industrial robots used for various tasks in plants and the like, the need to expand the range of motion of a task-performing hand, so as to increase the size of the reachable space, and the need to increase the critical or limit value of the driven speed can be met by appropriately defining the number of joints between the main unit and the task-performing hand, the arm (linkage) length and the driving power of the actuators. In contrast, in a legged mobile robot, particularly a humanoid robot or the like modeled after the form of the human body, design factors such as the number of joints and the link lengths are subject to greater restriction than in the case of an industrial robot owing to appearance and functional considerations. Moreover, autonomous robots are also limited with regard to usable actuators owing to power consumption, available mounting space and other considerations. In an autonomous legged mobile robot or the like therefore, expansion of the range of motion of the arms and legs, for example, and increase of the critical value of the driven speed have to be achieved by increasing the range of motion (angle of rotation) and increasing the critical value of the driven speed of the individual joints of the arms and legs.

As shown in FIG. 23, in a legged mobile robot equipped with ordinary single-axis joints, in order to avoid physical interference in the links 102 and 104 or covers covering them, their rotation axis 100 is sometimes offset outward from the center of links. This outward offsetting of the rotation axis lowers the likelihood of interference in the links and covers on the offset side and increases the range of movement.

In an articulated robot, however, as shown in FIG. 24, a posture in which their rotation axes (joints) 110, 112 and 114 are positioned on the same line constitutes a singularity posture. Since control diverges or oscillates when a robot assumes a singularity posture, the angle of rotation of the joints has to be constricted so that the singularity does not occur. In the elbow joint of the arm of a humanoid robot, for example, the elbow joint (corresponding to the rotation axis 112) has a range of motion between a slightly bending angle and the maximum bending angle.

Here, if, as shown in FIG. 23, the rotation axis 100 is offset outward for avoiding physical interference in the links and covers, it is necessary, as shown in FIG. 25, to establish an angle of rotation $\theta os$ between the state in which the links 102 and 104 are fully extended (state of the joint being driven as far in the extending direction as the mechanism permits) and the state in which the rotation axes 100, 106 and 108 are located on the same line, i.e., the singularity posture. The range of motion (angle of rotation) of the rotation axis 100 that can be utilized in control is therefore the range of motion determined by the mechanism, minus the angle of rotation $\theta os$. The angle of rotation $\theta os$ increases with increasing amount of offset of the rotation axis 100. The prior art therefore involves the inconvenience that when the rotation axis is offset in order to expand the range of motion in the bending direction, the range of motion in the direction of extension is markedly constricted and reduced.

DISCLOSURE OF THE INVENTION

The object of this invention is therefore to overcome the foregoing problem by providing a robot joint structure which enables the range of motion (angle of rotation) of the joint in the bending direction to be expanded without giving rise to physical interference with links or covers that cover them, minimizes reduction of the movable range in the direction of extension attributable to a singularity, and increases the critical value of the rotational speed (driven speed).

In order to achieve the object, as recited in claim 1 mentioned below, this invention is configured to have a robot joint structure having a first main link and a second main link connected through a first movable link and a second movable link, and an actuator installed on the first main link and driving the first movable link such that the first main link and the second main link are displaced relative to each other; characterized in that: rotation axes A and B each provided at the first main link; and rotation axes C and D each provided at the second main link; wherein in a quadrangle whose apices are formed by the rotation axes A, B, C and D, when assuming that rotation axes that are diagonally opposed to each other are A and C, while those that are diagonally opposed to each other are B and D, the rotation axes A and C are connected through the first movable link and the rotation axes B and D are connected through the second movable link in such a manner that the first movable link and the second movable link are disposed to cross and that the rotation axis A is driven by the actuator to drive the first movable link, such that the first main link and the second main link are displaced relative to each other.

Thus, since it is configured such that the first main link (e.g., an upper arm link) and the second main link (e.g., a forearm link) are connected through the first movable link and the second movable link, and the two movable links are arranged to cross. This structure makes it possible to increase the overall driven angle of the joint (e.g., an elbow joint) relative to the input, expand the range of motion of the joint in the bending direction, and also raise the critical value of the driven speed (rotational speed).

In addition, the amount of outward projection of the two movable links is small, so that there is little risk of the movable links and covers covering them coming into physical interference. Further, interference with a cover covering the first main link and a cover covering the second main link becomes unlikely because the joint bends over two stages with the two rotation axes acting as fulcrums. As a result, the range of motion of the joint in the bending direction can be further expanded. Moreover, the rotation axes of the joint do not have to be offset outward of the joint, so that reduction of the movable range of the joint in the direction of extension attributable to the singularity can be minimized.

As recited in claim 2 mentioned below, the invention is configured such that, the rotation axis A and the rotation axis B are provided on or near a same straight line lying perpendicular to a longitudinal direction of the first main link.

Thus, since it is configured such that, the rotation axis A and the rotation axis B are provided on or near the same straight line lying perpendicular to the longitudinal direction of the first main link, it becomes possible to further expand that range of motion of the joint in the bending direction and also to increase the driven speed of the joint.

As recited in claim 3 mentioned below, this invention is configured such that, the rotation axis C and the rotation axis D are provided on or near a same straight line lying perpendicular to a longitudinal direction of the second main link.

Thus, since it is configured such that, the rotation axis C and the rotation axis D are provided on or near the same straight line lying perpendicular to the longitudinal direction of the second main link, it becomes possible to further expand that range of motion of the joint in the bending direction and also to increase the driven speed of the joint.

As recited in claim 4 mentioned below, this invention is configured such that, at least one of the first movable link and the second movable link is given a curved shape, so as not to interfere with the rotation axes of the other of the first movable link and the second movable link.

Thus, since it is configured such that, at least one of the first movable link and the second movable link is given the curved shape, so as not to interfere with the rotation axes of the other of the first movable link and the second movable link, the first movable link and the second movable link do not interfere with the rotation axes of the others, so that the range of motion of the joint in the bending direction can be further expanded.

As recited in claim 5 mentioned below, this invention is configured such that, at least one of the first movable link and the second movable link is provided with an over-rotation prevention mechanism that prevents the joint from over-rotating beyond predetermined angles.

Thus, since it is configured such that, at least one of the first movable link and the second movable link is provided with the over-rotation prevention mechanism that prevents the joint from over-rotating beyond predetermined angles, it becomes possible to prevent the control from diverging or oscillating attributed to the singularity and to preclude covers from being damaged due to excessive joint bending.

As recited in claim 6 mentioned below, this invention is configured such that, the joint is provided with covers covering the first main link, the first movable link, the second movable link, the second main link and the actuator from outside, the covers comprising: a first cover covering the first main link and the actuator; a second cover covering the second main link; and a third cover slidably interposed between the first cover and the second cover, and covering the first and second movable links and a gap formed between the first and second covers occurring with rotation of the joint.

Thus, since it is configured such that, covers covering the joint comprises the first cover, the second cover and the third cover slidably interposed between the first cover and the second cover, and covering the first and second movable links and a gap formed between the first and second covers occurring with rotation of the joint, the joint can be kept from exposing the internal structure and in addition to the foregoing effects or advantages, it become further possible to improve the dust resistance and safety of the joint. In addition, the appearance of the robot can be enhanced.

BRIEF EXPLANATION OF THE DRAWINGS

FIG. 14 is a set of views for explaining, inter alia, the maximum value Rmax of the straight-line distance R from the shoulder joint to the wrist joint of the robot shown in FIG. 3.

BEST MODE OF CARRYING OUT THE INVENTION

A robot joint structure according to embodiments of the present invention will be explained with reference to the attached drawings in the following, taking as an example a legged mobile robot, more specifically a humanoid robot (mobile robot modeled after the form of the human body).

Figure 1:
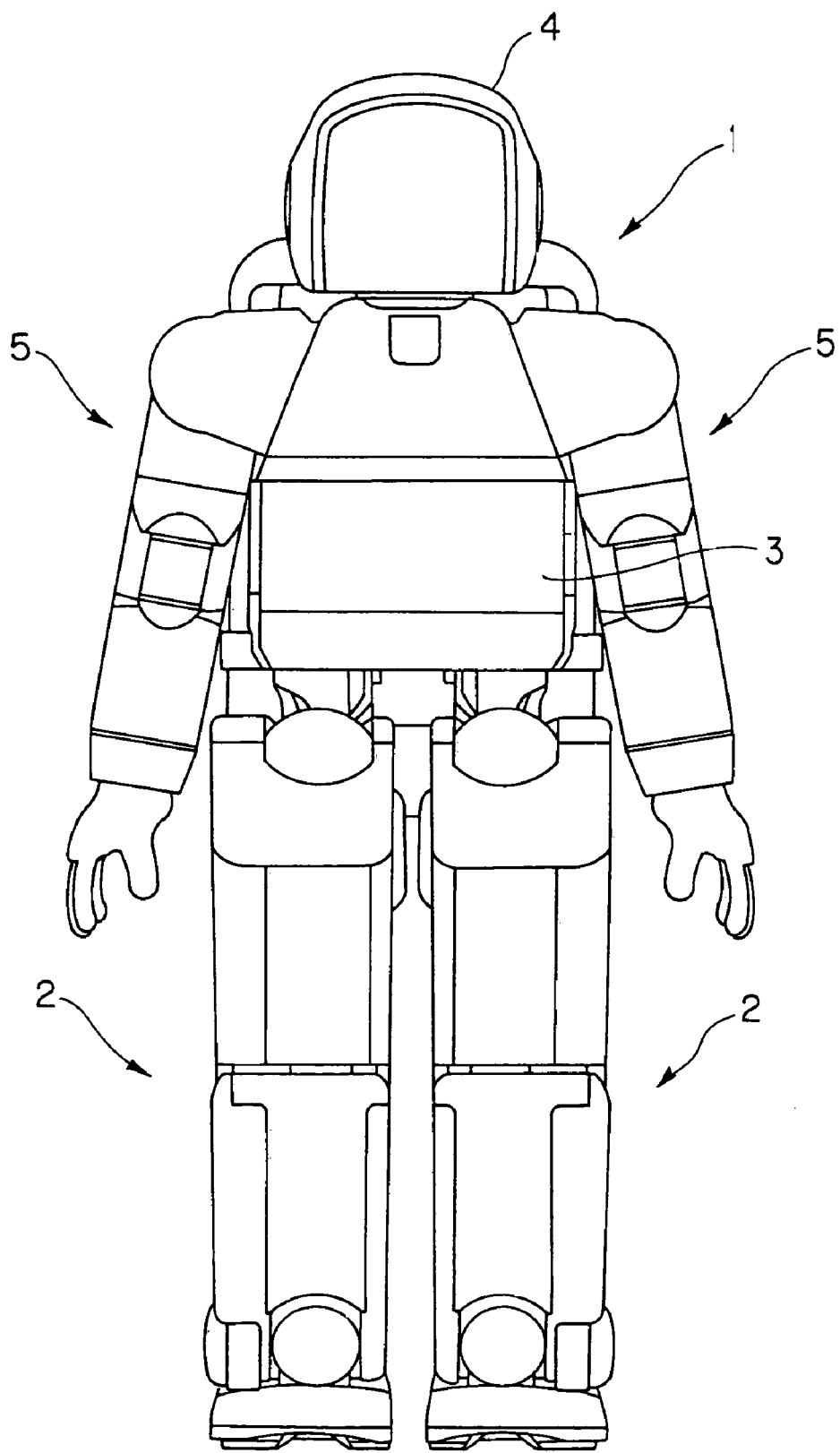
FIG. 1 is a front view of a robot for explaining a robot joint structure according to an embodiment of this invention when taking a legged mobile robot as an example.
Figure 2:
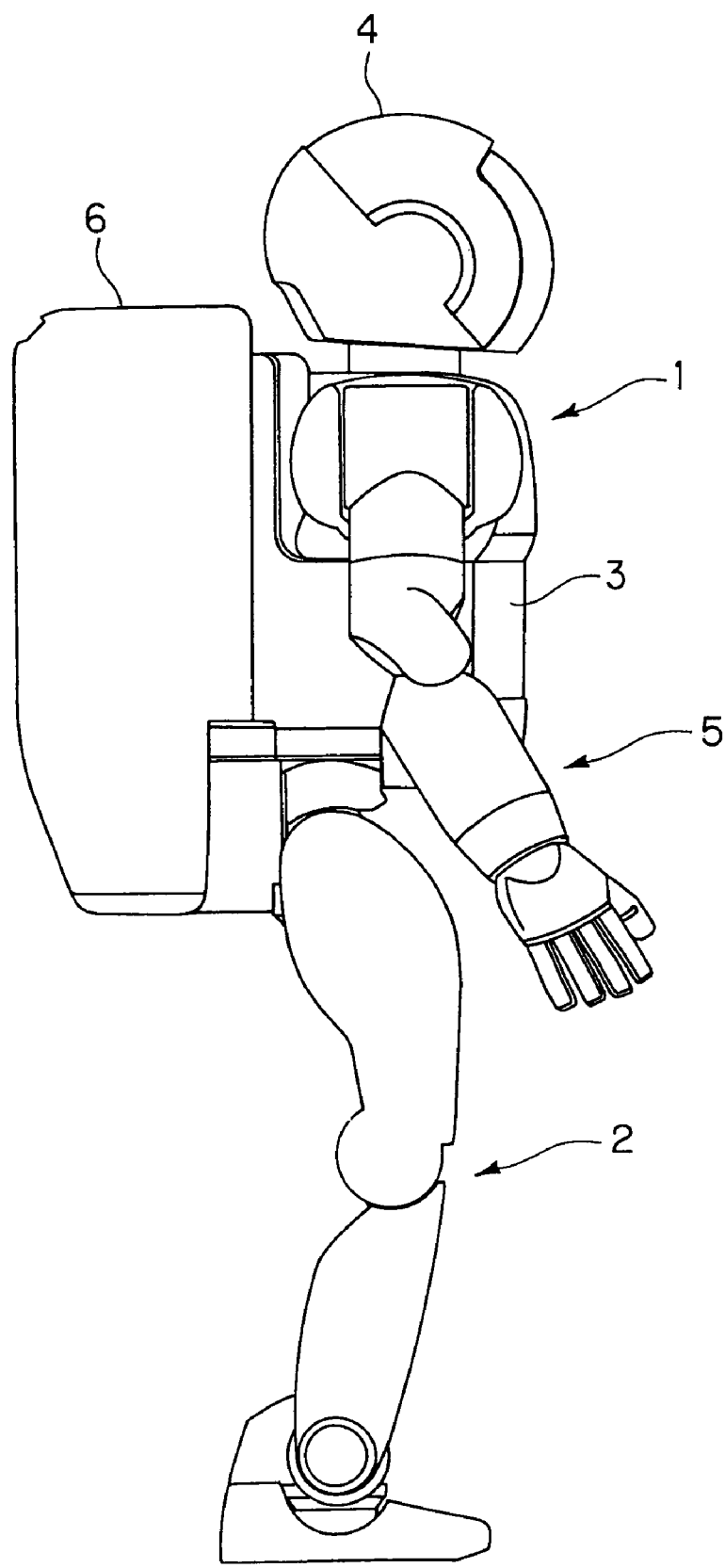
FIG. 2 is a right side view of the robot shown in FIG. 1.

FIG. 1 is a front view of the robot according to a first embodiment and FIG. 2 is right side view thereof.

As shown in FIG. 1, the robot 1 is equipped with a pair of leg linkages 2 and an upper body (main unit) 3 above the leg linkages 2. A head 4 is formed on the upper end of the upper body 3 and two arm linkages 5 are connected to opposite sides of the upper body 3. As shown in FIG. 2, a housing unit 6 is mounted on the back of the upper body 3 for accommodating therein, inter alia, an electronic control unit and a power supply battery. The robot 1 shown in FIGS. 1 and 2 is equipped with covers for protecting its internal structures.

Figure 3:
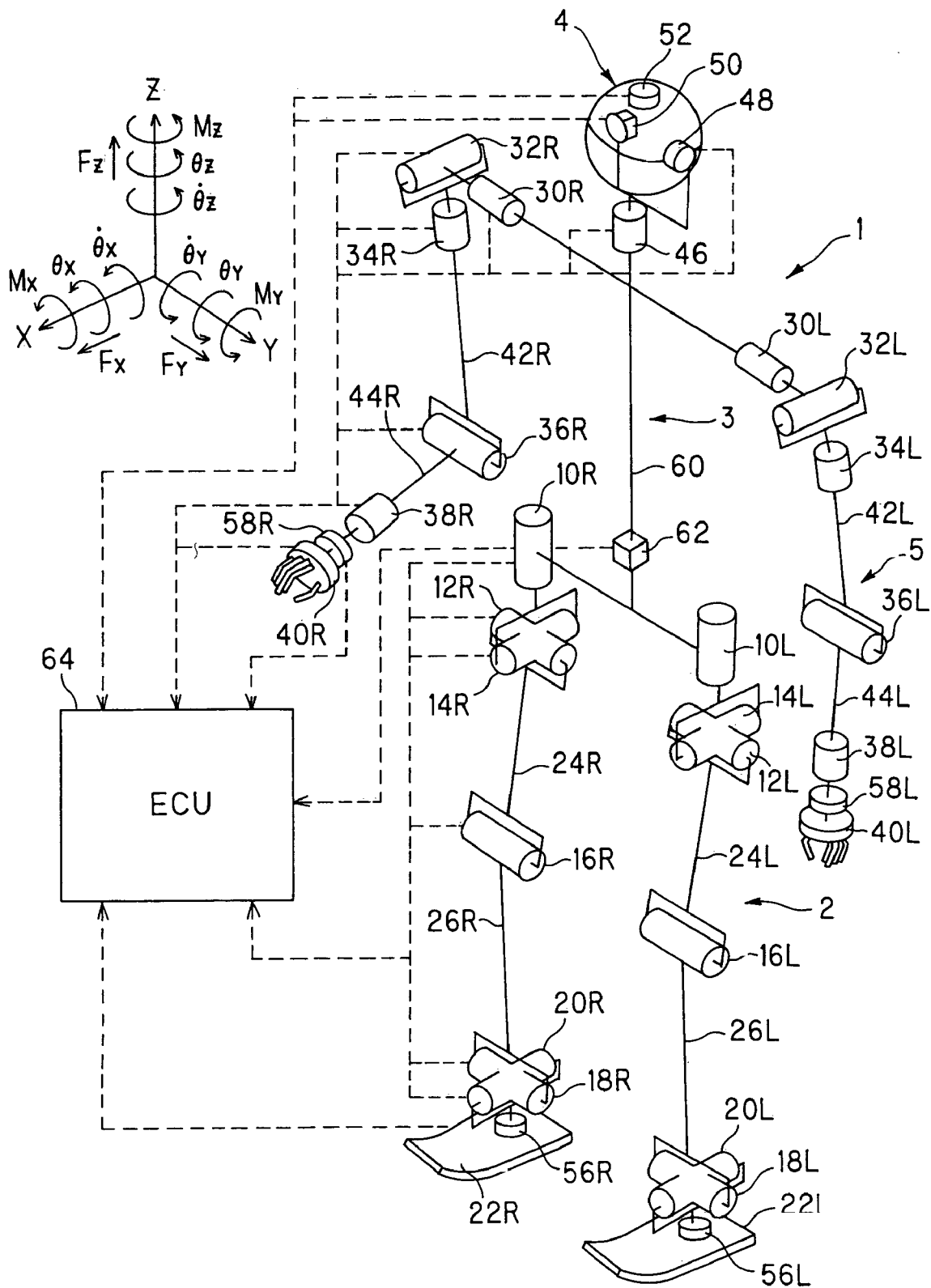
FIG. 3 is an explanatory view showing a skeletonized view of the robot of FIG. 1.

FIG. 3 is an explanatory view showing a skeletonized view of the robot 1. The number and locations of the joints will be explained with reference to this drawing. As illustrated, the left and right leg linkages 2 of the robot 1 are each equipped with six joints and the arm linkages 5 are equipped with five joints.

In the leg linkages 2, the six joints comprises, from top to bottom in the gravity direction, joints 10R, 10L (R and L indicating the right and left sides; hereinafter the same) (Z axis) for leg swiveling around a crotch (hips), pitch direction (around Y axis) joints 12R, 12L of the crotch (hips), roll direction (around X axis) joints 14R, 14L of the crotch (hips), pitch direction joints 16R, 16L of knees, pitch direction joints 18R, 18L of ankles, and roll direction joints 20R, 20L of the ankles. In other words, the crotch joints (or hip joints) comprises the joints 10R(L), 12R(L), 14R(L), the knee joints of the joints 16R(L), and the ankle joints of the joints 18R(L), 20R(L).

Feet 22R, L are attached to the lower ends of the ankle joints 18R(L), 20R(L). The crotch joints 10R(L), 12R(L), 14R(L) are linked to the knee joints 16R(L) by thigh links 24R, L, and the knee joints 16R(L) are linked to the ankle joints 18R(L), 20R(L) by shank links 26R, L.

On the other hand, in the arm linkages 5, the five joints comprises from top to bottom in the gravity direction, pitch direction joints 30R, 30L of the shoulders, roll direction joints 32R, 32L of the shoulders, joints 34R, 34L for arm swiveling, pitch direction joints 36R, 36L of elbows, and joints 38R, 38L for wrist swiveling. In other words, the shoulder joints comprises the joints 30R (L), 32R(L), 34R(L), the elbow joints of the joints 36R(L), and the wrist joints of the joints 38R(L).

Hands (end effectors) 40R, 40L are attached to the distal ends of the wrist joints 38R(L). The shoulder joints 30R(L), 32R(L), 34R(L) are linked to the elbow joints 36R(L) by upper arm links 42R, L, and the elbow joints 36R(L) are linked to the wrist joints 38R(L) by forearm links 44R, L.

The head 4 is linked to the upper body 3 through a neck joint 46 around a vertical axis and a head swivel mechanism 48 for rotating the head 4 around an axis perpendicular thereto. Inside the head 4 are mounted a visual sensor 50 composed of a CCD camera for taking images and outputting image signals, and an audio input/output device 52 composed of a receiver and a microphone.

As shown in the drawing, conventional six-axis force sensors (floor reaction force detectors) 56R(L) are attached between the ankle joints 18, 20R(L) and the ground contact ends of the feet 22R(L) for outputting signals representing force components Fx, Fy and Fz of three directions and moment components Mx, My and Mz of three directions.

Similar six-axis force sensors 58R(L) are also attached between the wrist joints 38R(L) and the hands 40R(L) for outputting signals representing force components Fx, Fy and Fz of three directions and moment components Mx, My and Mz of three directions of external forces other than floor reaction forces acting on the robot 1, specifically external forces acting on the hands 40R(L) from objects (object reaction forces).

In addition, an inclination sensor 62 is installed on an upper body link 60 for outputting a signal representing inclination relative to the Z axis (vertical direction (gravity direction)) and the angular velocity thereof. Moreover, the electric motors (actuators; not shown) for driving the respective joints are provided with rotary encoders (not shown) for outputting signals representing amount of rotation.

The outputs of the six-axis force sensors 56R(L), 58R(L), inclination sensor 62 etc. are input to an electronic control unit 64 provided in the housing unit 6. The control unit 64 comprises a microcomputer. Based on data stored in a memory (not shown) and the input detection values, the control unit 64 computes the control values for the electric motors (not shown in the drawing) that drive the joints.

The left and right leg linkages 2R(L) of the robot 1 are thus each imparted with six degrees of freedom, so that the legs as a whole can be imparted with desired movements by operating the electric motors for driving these 6×2=12 joints based on the control values computed by the control unit 64, thereby enabling the robot 1 to move freely within three-dimensional space. Further, the left and right arm linkages 5R(L) are each imparted with five degrees of freedom (not including the hands 40R(L)), so that the arms as a whole can be imparted with desired movements by operating the electric motors for driving these 5×2=10 joints based on the control values calculated by the control unit 64, thereby enabling execution of desired operations (tasks).

The joint structure of the robot 1 will now be explained with reference to FIG. 4 and the ensuing figures. Although the explanation will be made in the following taking the elbow joints 36R(L) as an example, the symbols R and L will be omitted because the structures of the elbow joints 36R(L) are laterally symmetrical.

Figure 4:
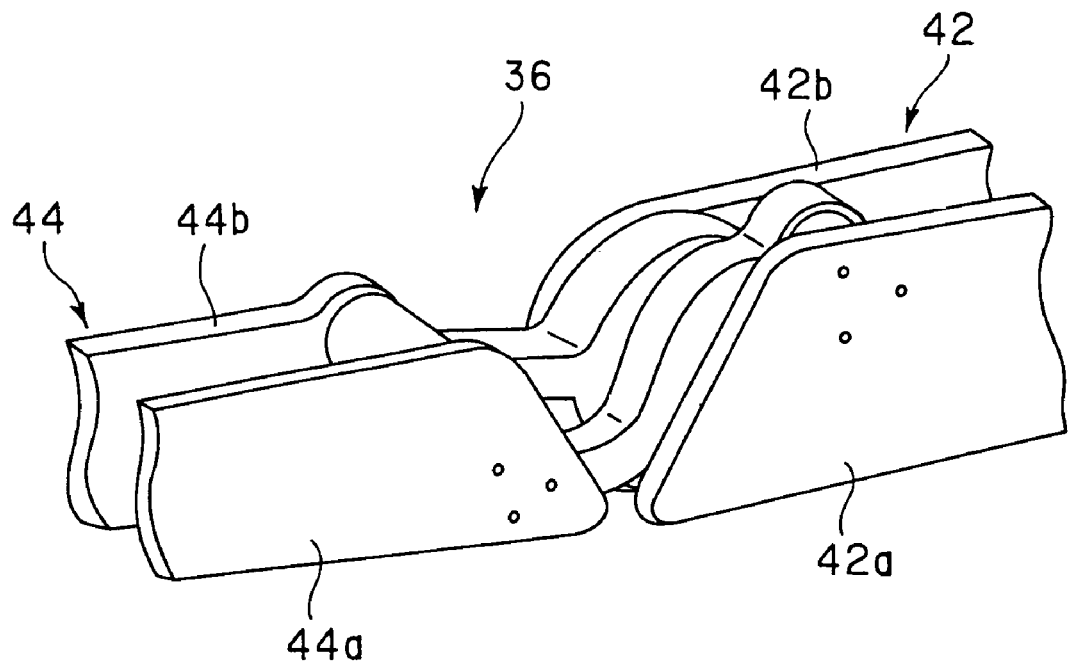
FIG. 4 is a perspective view of the vicinity of an elbow joint shown in FIG. 3.

FIG. 4 is a perspective view of the vicinity of the elbow joint 36. The drawing shows the elbow joint 36 with covers for protecting its internal structure removed.

As illustrated, the upper arm link 42 is constituted by a first plate (hereinafter called the "upper arm first plate) 42a and a second plate (hereinafter called the "upper arm second plate) 42b. The upper arm first plate 42a and upper arm second plate 42b are fastened by bolts (not shown). The forearm link 44 is similarly constituted by a first plate (hereinafter called the "forearm first plate") 44a and a second plate (hereinafter called the "forearm second plate) 44b, which are also fastened by bolts (not shown).

Figure 5:
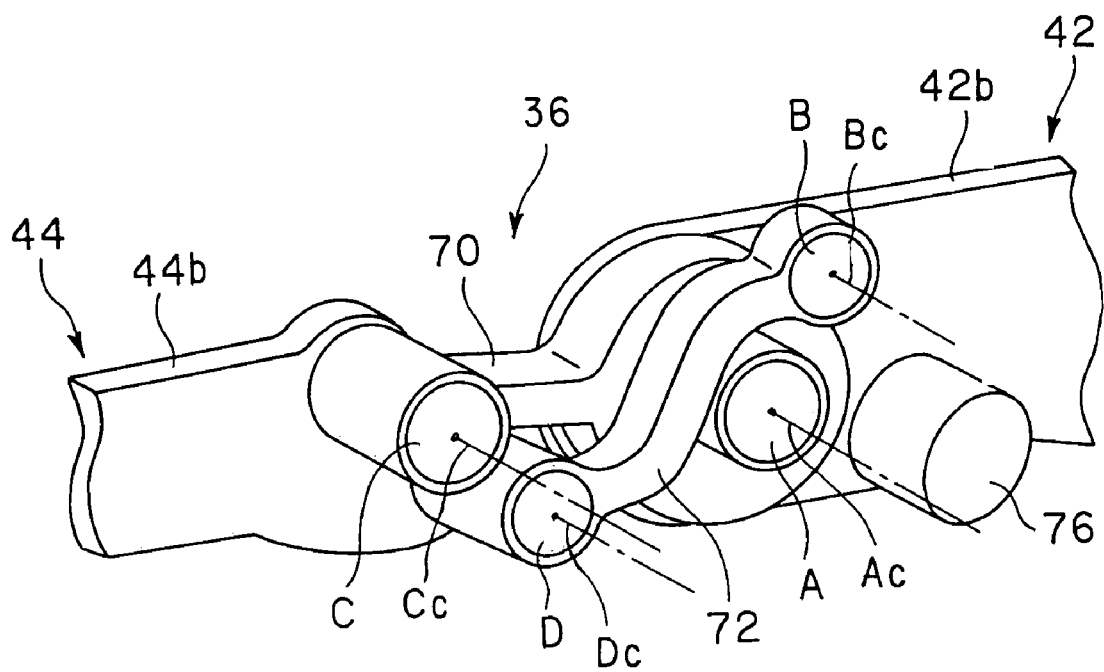
FIG. 5 is a perspective view of the elbow joint shown in FIG. 4 with an upper arm first plate and a forearm first plate removed.

FIG. 5 is a perspective view of the elbow joint 36 shown in FIG. 4 with the upper arm first plate 42a and forearm first plate 44a removed.

As shown in the drawing, the upper arm link 42 is provided with an rotation axis A and an rotation axis B. The rotation axis A comprises projections provided on the upper arm first plate 42a and upper arm second plate 42b and a bearing disposed around the outer periphery thereof (none of which are shown). The rotation axis B comprises a projection provided on the upper arm first plate 42a and a bearing disposed around the outer periphery thereof (neither shown). The centers of the rotation axes A and B are designated Ac and Bc.

The forearm link 44 is provided with a rotation axis C and a rotation axis D. The rotation axis C comprises projections provided on the forearm first plate 44a and forearm second plate 44b and a bearing disposed around the outer periphery thereof. The rotation axis D comprises similar members. The centers of the rotation axes C and D are designated Cc and Dc.

The elbow joint 36 is provided with a first movable link 70 and second movable link 72. One end of the first movable link 70 is fastened to the rotation axis A and the other end thereof is rotatably connected to the rotation axis C. On the other hand, one end of the second movable link 72 is rotatably connected to the rotation axis B and the other end thereof is rotatably connected to the rotation axis D. In other words, the upper arm link 42 and forearm link 44 are connected through the first movable link 70 and second movable link 72 to be displaceable relative to each other.

In the upper arm link 42, an electric motor (actuator) 76 is installed above (toward the shoulder from) the rotation axis A and rotation axis B. The output of the electric motor 76 is transmitted to the rotation axis A through a speed reducer (not shown) to drive the first movable link 70 fastened to the rotation axis A. As a result, the upper arm link 42 and forearm link 44 are displaced relative to each other.

Figure 6:
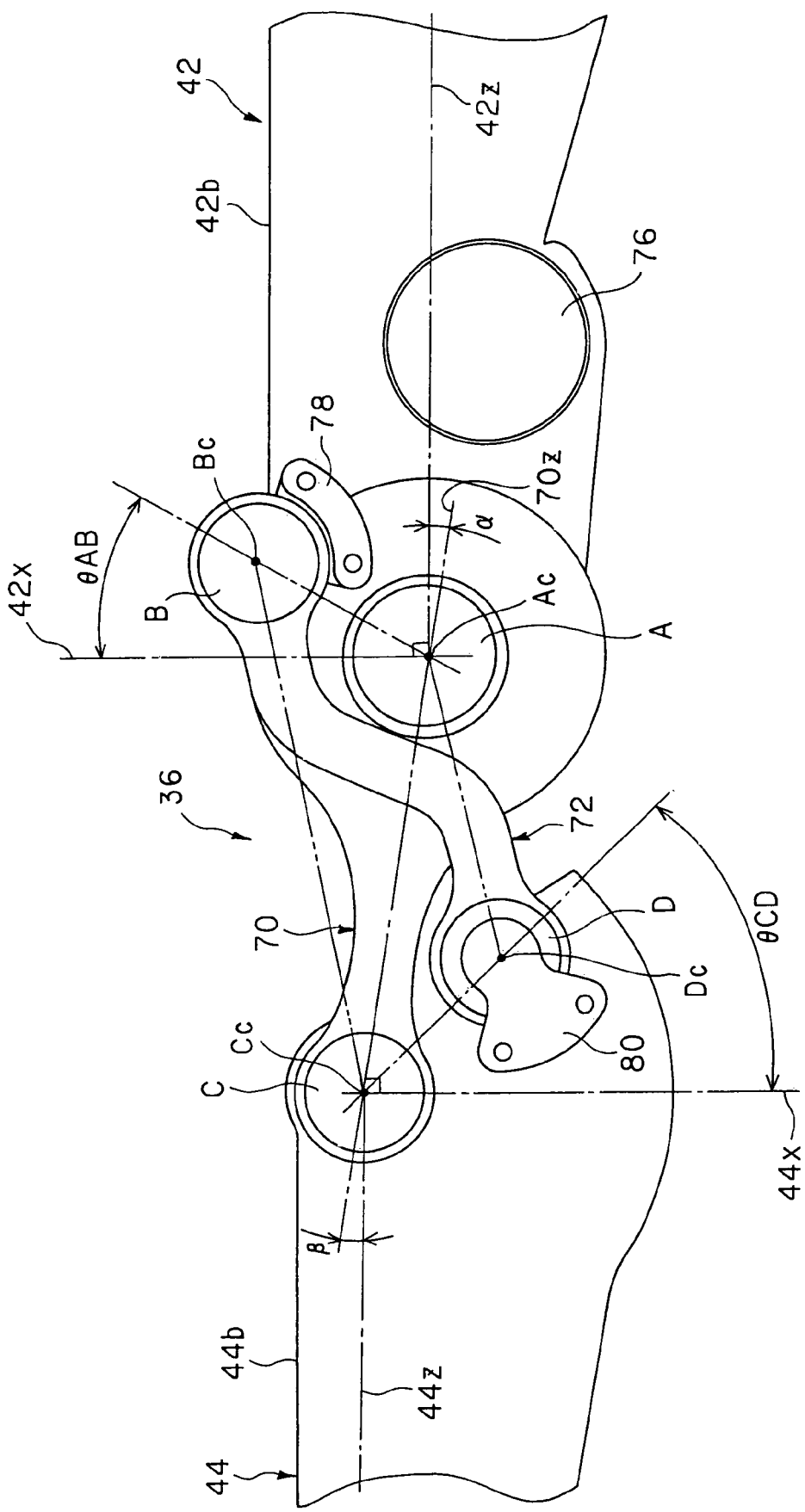
FIG. 6 is an enlarged plan view of the elbow joint shown in FIG. 5.

FIG. 6 is an enlarged plan view of the elbow joint 36 shown in FIG. 5. Symbol 78 in this drawing designates a member for supporting the rotation axis B on the upper arm first plate 42a and symbol 80 designates a member for supporting the rotation axis D on the forearm first plate 44a. The members 78, 80 are omitted in FIGS. 4 and 5.

As shown in FIG. 6, in the quadrangle having the centers of rotation Ac, Bc, Cc and Dc of the rotation axes A, B, C and D as its apices, the diagonally opposed rotation axes are the rotation axis A and rotation axis C, and the rotation axis B and rotation axis D. Thus, owing to the connection of the rotation axis A and rotation axis C by the first movable link 70 and the connection of the rotation axis B and rotation axis D by the second movable link 72, the first movable link 70 and second movable link 72 are disposed so as to cross. The second movable link 72 is given a curved shape, specifically an S-like shape, detouring the rotation axis A so as to avoid interference with the rotation axis A.

Figure 7:
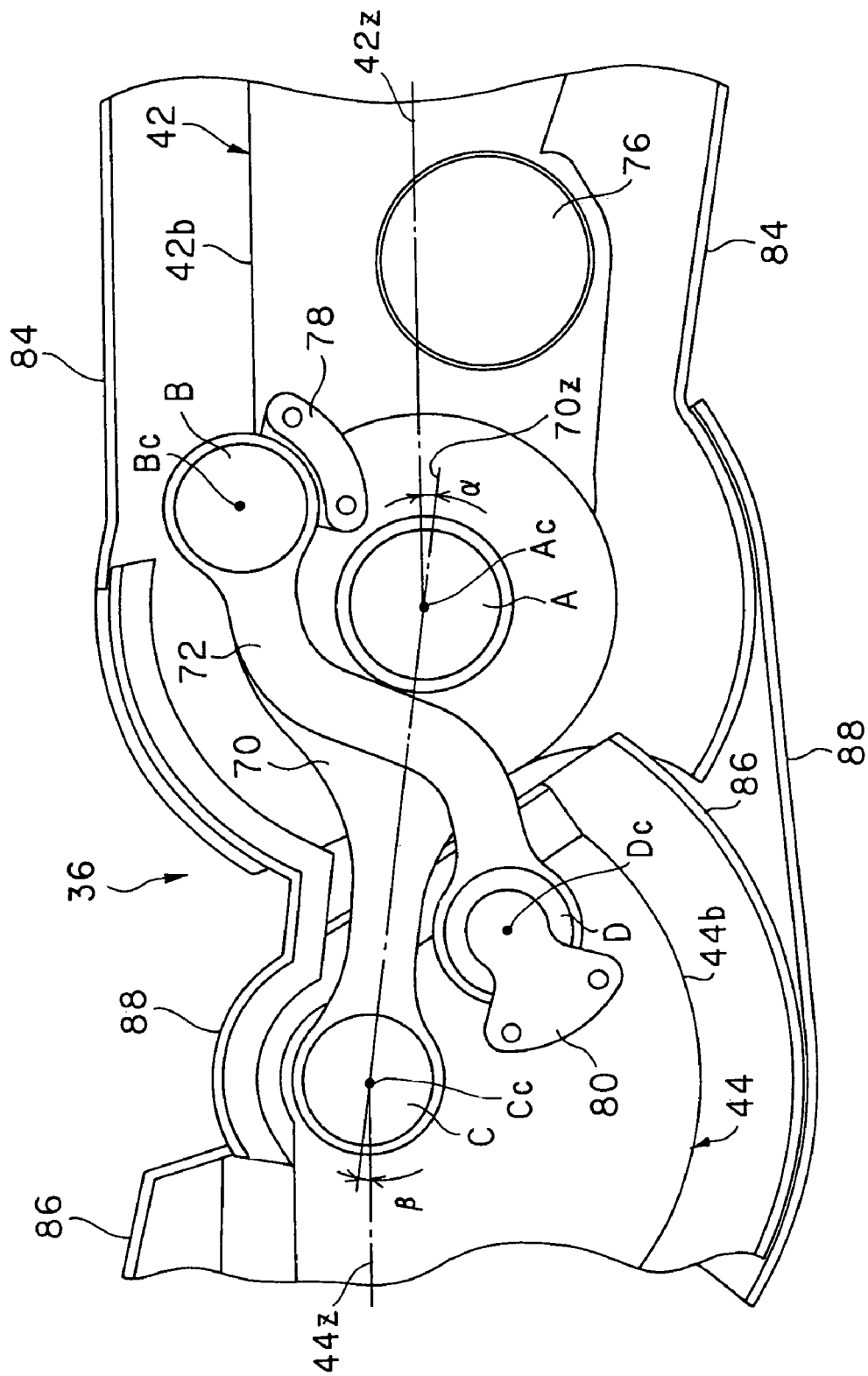
FIG. 7 is a plan view of the elbow joint shown in FIG. 6 together with covers.

FIG. 7 is a plan view of the elbow joint 36 shown in FIG. 6 together with covers.

As shown in the drawing, the elbow joint 36 is provided with covers (casings) for covering the links from the outside. The covers include a first cover 84 covering the upper arm link 42 and electric motor 76, a second cover 86 covering the forearm link 44, and a third cover 88 slidably interposed between the first cover 84 and second cover 86 for covering the first movable link 70 and second movable link 72.

Figure 8:
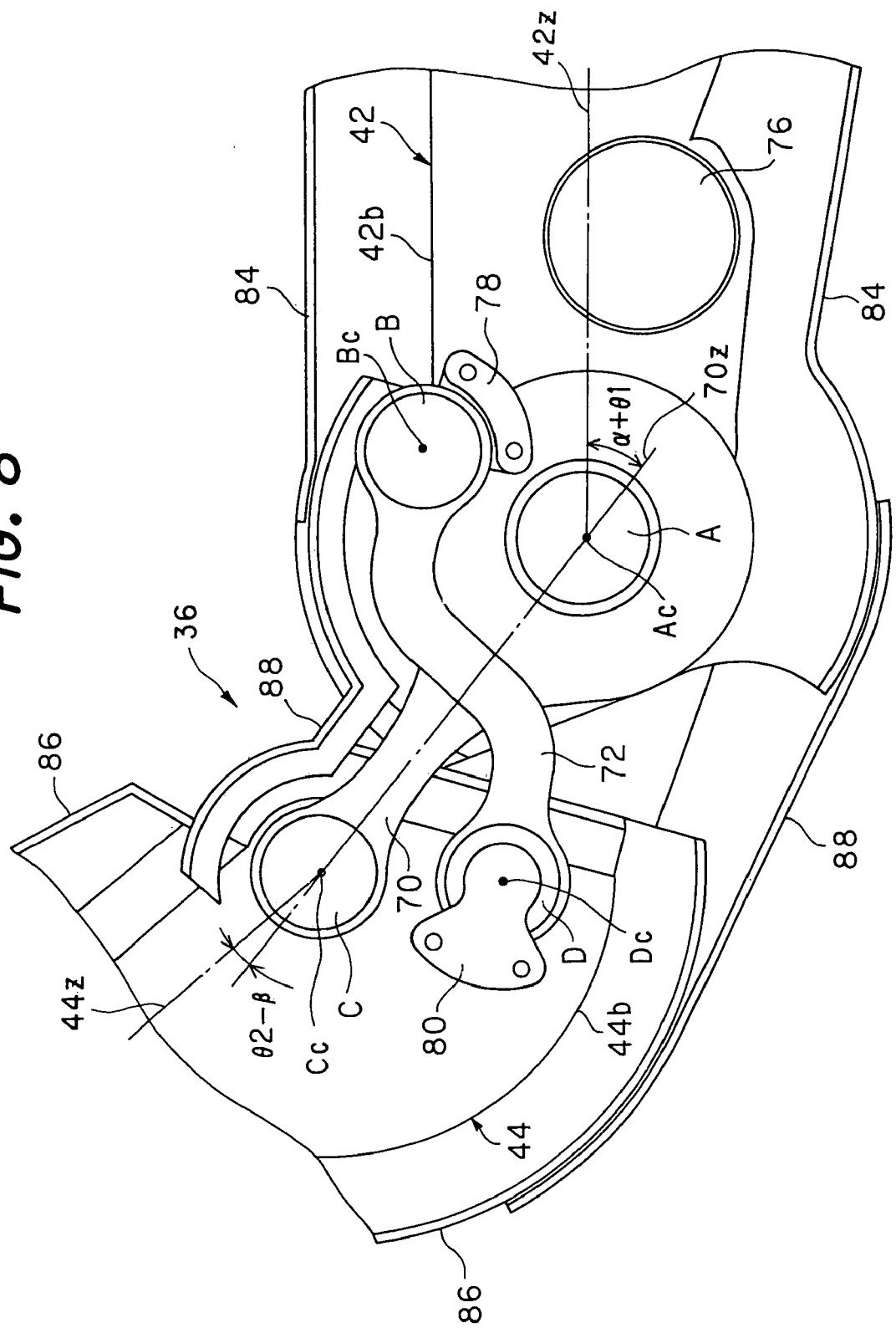
FIG. 8 is a plan view showing a driven state of the elbow joint shown in FIG. 7.
Figure 9:
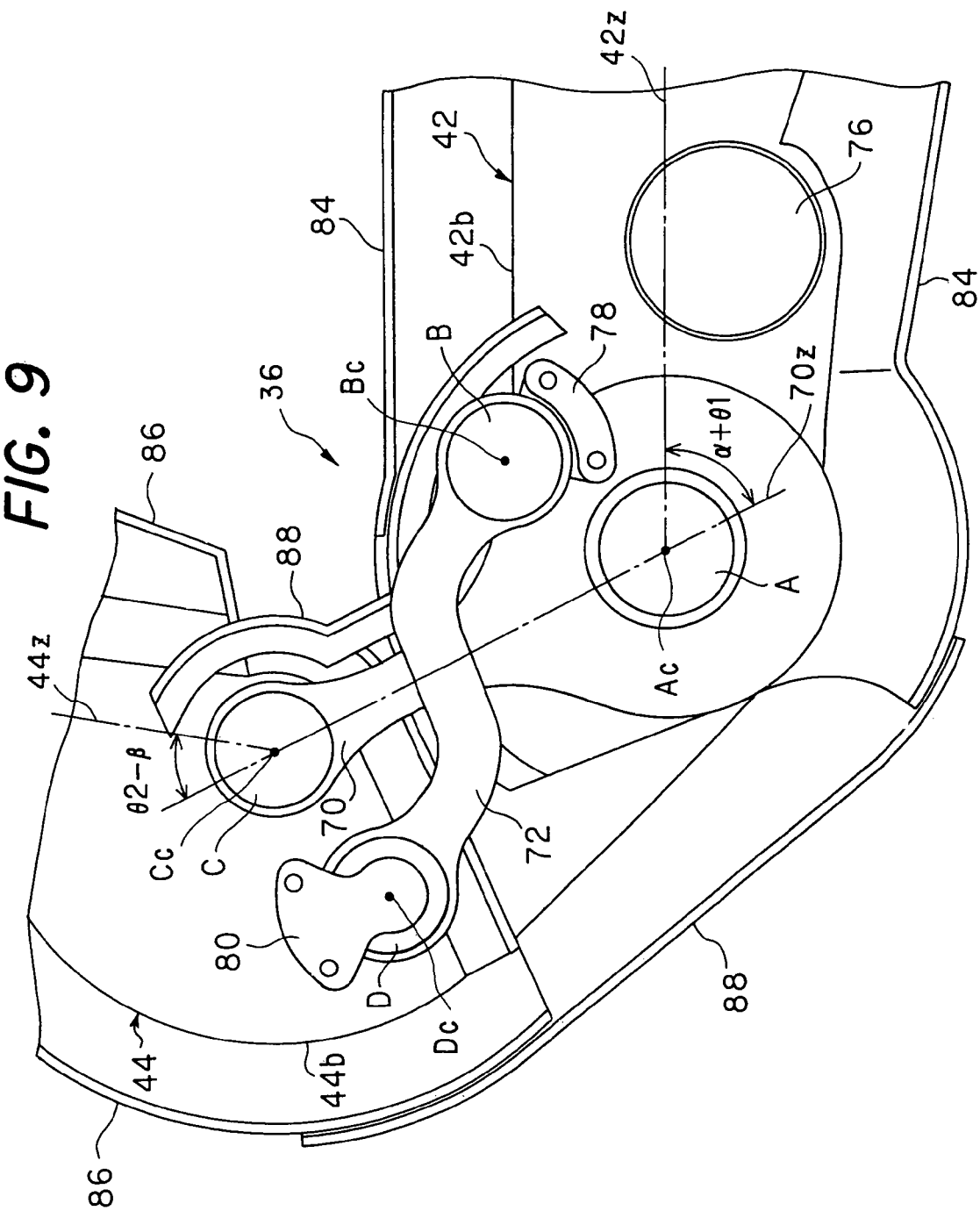
FIG. 9 is a plan view similar to FIG. 8 showing a driven state of the elbow joint shown in FIG. 7.

FIGS. 8 and 9 are plan views showing the elbow joint 36 shown in FIG. 7 in driven states.

As shown in FIGS. 8 and 9, when the rotation axis A is rotated to drive the first movable link 70 in the bending direction, the straight-line distance between the rotation axis B and rotation axis C is shortened. Since the straight-line distance between the rotation axis B and rotation axis D and the relative positional relationship between the rotation axis C and rotation axis D remain unchanged at this time, the forearm link 44 continues to be driven in the bending direction around the rotation axis C as the fulcrum.

Figure 10:
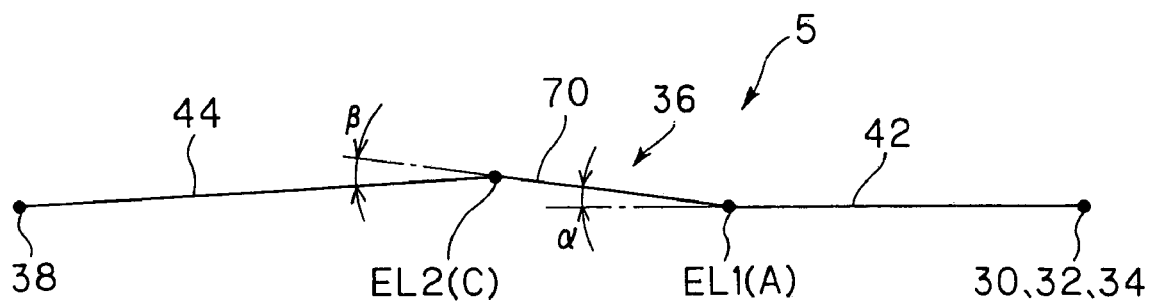
FIG. 10 is an explanatory view schematically illustrating an arm linkage in the fully extended state of the elbow joint of FIG. 6.

FIG. 10 is an explanatory view schematically illustrating the arm linkage 5 in the fully extended state of the elbow joint 36. Here, the fully extended state of the elbow joint means the state in which the elbow joint 36 has been driven in the extending direction to the movement limit determined by the mechanism (and is not necessarily the same as the state in which the straight-line distance between the shoulder joint and wrist joint is longest).

In this drawing, EL1 means the rotation axis A of the elbow joint 36, and EL2 means the rotation axis C of the elbow joint 36. As shown in FIG. 6, angle $\alpha$ is the angle formed between the longitudinal direction of the upper arm link 42 in the fully extended state of the elbow joint 36 (designated 42z) and the longitudinal direction of the first movable link 70 (designated 70z), and angle $\beta$ is the angle formed between the longitudinal direction of the first movable link 70 and the longitudinal direction of the forearm link 44 (designated 44z).

Figure 11:
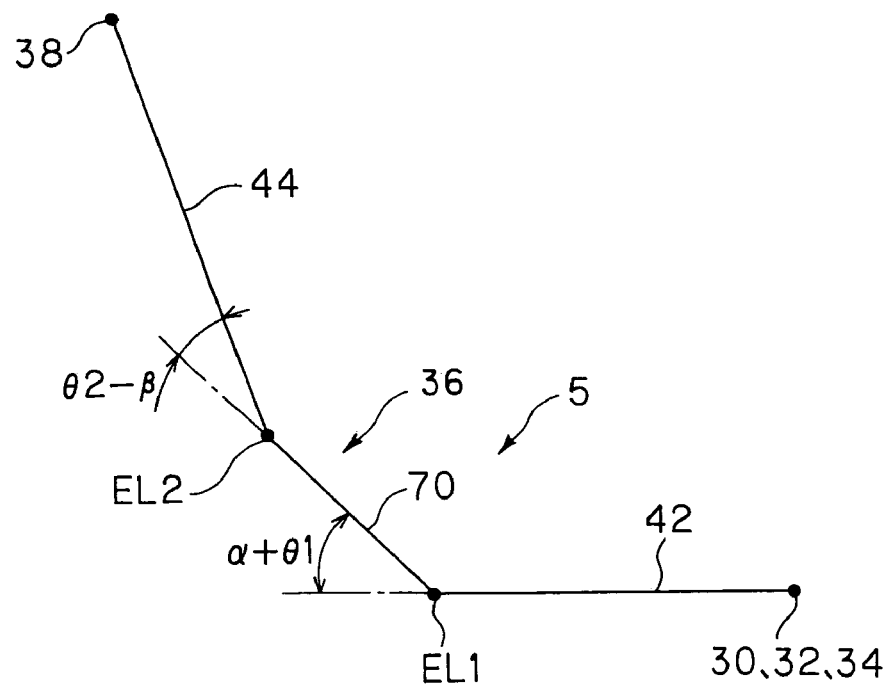
FIG. 11 is an explanatory view schematically illustrating an arm linkage in the bent state of the elbow joint of FIG. 6.

In the arm linkage 5 shown in FIG. 10, when the electric motor operates to drive EL1, i.e., the rotation axis A, by $\theta 1$, then, as shown in FIG. 11, the angle formed between the longitudinal direction of the upper arm link 42 and the longitudinal direction of the first movable link 70 becomes $\alpha + \theta 1$. Further, when EL2 is driven, i.e., when the forearm link 44 is driven around the rotation axis C as the fulcrum, the angle formed between longitudinal direction of the first movable link 70 and the longitudinal direction of the forearm link 44 becomes $\theta 2 - \beta$. The overall driven angle of the elbow joint 36 therefore becomes $\theta 1 + \theta 2$. Here, $\theta 2$ can be represented by the following Equation 1.

$$\theta 2 = \theta CD + \alpha - 2\tan^{-1}\frac{b' - c\sin(\theta 1 + \alpha - \theta AB) - \sqrt{dc' - \{a - b'\sin(\theta 1 + \alpha - \theta AB) - c'\}^2}}{a - b\sin(\theta 1 + \alpha - \theta AB) - c\cos(\theta 1 + \alpha - \theta AB)} \text{ [degrees]} \quad \text{Eq. 1}$$

As shown in FIG. 6, $\theta AB$ in this equation is the angle formed between the direction perpendicular (designated 42x) to the longitudinal direction (42z) of the upper arm link 42 and the line connecting the centers of rotation Ac and Bc of the rotation axes A and B. In this embodiment, it is 30 degrees (the angle being defined as a positive angle in the case where the rotation axis B is located upward in the gravity direction (toward the shoulder) from the rotation axis A and as a negative angle in the opposite case). Further, $\theta CD$ is the angle formed between the direction perpendicular (designated 44x) to the longitudinal direction (44z) of the forearm link 44 and the line connecting the centers of rotation Cc, Dc of the rotation axes C and D. In this embodiment, it is 45 degrees (the angle being defined as a positive angle in the case where the rotation axis D is located upward in the gravity direction (toward the shoulder) from the rotation axis C and as a negative angle in the opposite case).

The values a, b, b', c, c' and d can be represented by the following Equations 2, when the center distance between the rotation axis A and rotation axis C (specifically, the straight-line distance between the centers of rotation Ac and Cc, i.e., the axis-to-axis distance of the first movable link 70) is defined as rAC, the center distance between the rotation axis B and rotation axis D (specifically, the straight-line distance between the centers of rotation Bc and Dc, i.e., the axis-to-axis distance of the second movable link 72) is defined as rBD, the center distance between the rotation axis A and rotation axis B is defined as rAB, and the center distance between the rotation axis C and rotation axis D is defined as rCD.

$a = rAC^2 + rAB^2 + rCD^2 - rBD^2$ $b = 2rAC \times rAB$ $b' = 2rAC \times rCD$ $c = 2rAB \times rCD$ $c' = 2rCD^2$ $d = 2rBD^2$ \hfill Eqs. 2

When the center distance rAB between the rotation axis A and rotation axis B and the center distance rCD between the rotation axis C and rotation axis D are equal, the values b and b' are equal, and the values c and c' are equal, so that θ2 can be represented by the following Equation 3.

$$\theta2 = \theta CD + \alpha - 2\tan^{-1} \frac{b - c\sin(\theta1 + \alpha - \theta AB) - \sqrt{dc - \{a - b\sin(\theta1 + \alpha - \theta AB) - c\}^2}}{a - b\sin(\theta1 + \alpha - \theta AB) - c\cos(\theta1 + \alpha - \theta AB)} \quad [\text{degrees}]$$

Eq. 3

Here, the values a, b, c and d in Equation 3 can be represented by the following Equations 4.

$$a = rAC^2 + 2rAB^2 - rBD = rAC^2 + 2rCD^2 - rBD^2$$

$$b = 2rAC \times rAB = 2rAC \times rCD$$

$$c = 2rAB^2 = 2rCD^2$$

$$d = 2rBD^2$$

Eqs. 4

Figure 12:
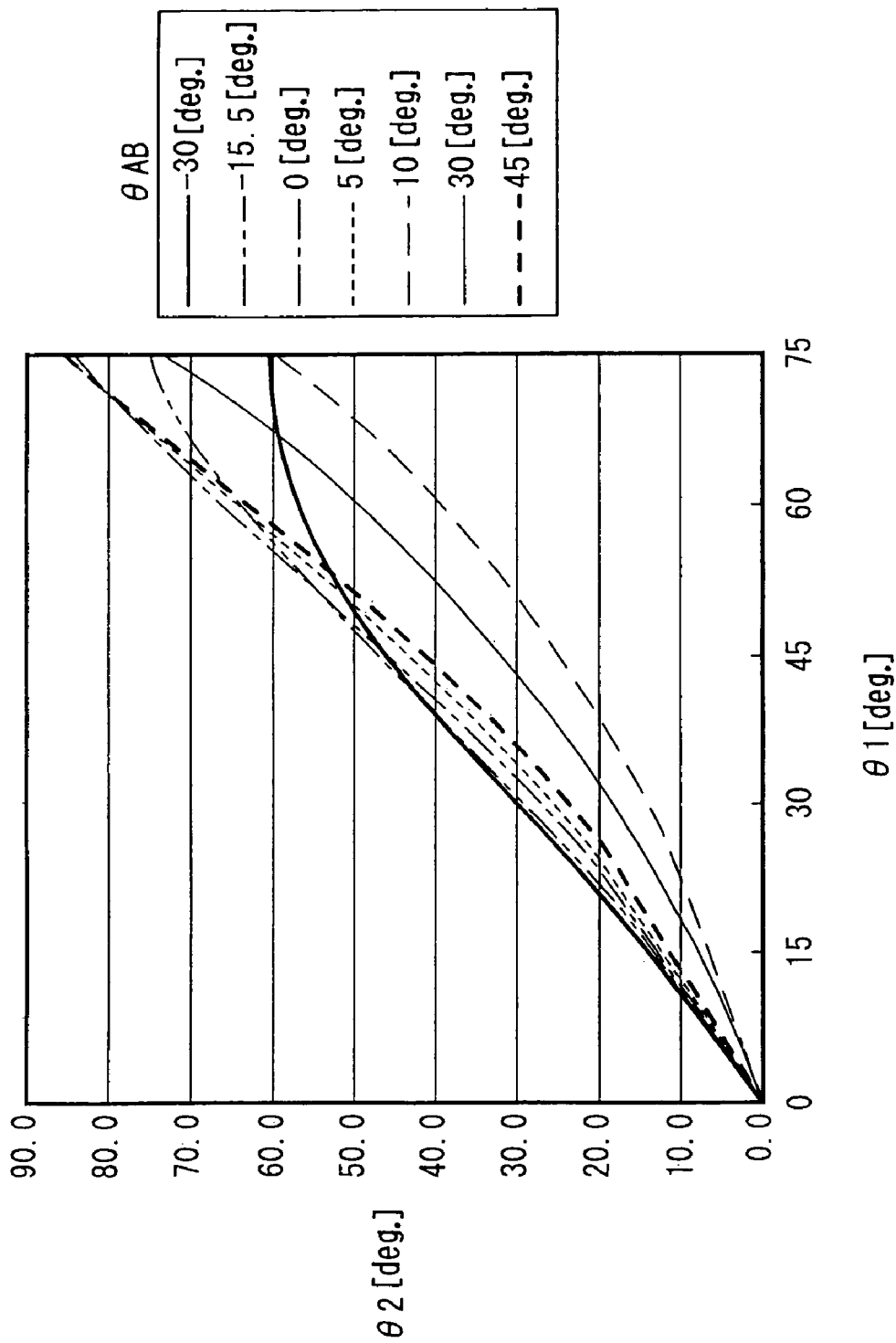
FIG. 12 is a graph showing how the relationship between $\theta 1$ and $\theta 2$ changes at different values of $\theta AB$ when $\theta CD$ is made 45 degrees in the elbow joint of FIG. 6.

FIG. 12 is a graph showing how the relationship between θ1 and θ2 changes at different values of θAB when θCD is made 45 degrees.

From the graph it can be seen that when θCD is made 45 degrees and θAB is made 30 degrees, θ2 increases in a substantially one-to-one relationship approximately in proportion to increase in θ1. In other words, the output angle of rotation (overall angle of rotation of the elbow joint 36, i.e., θ1+θ2) becomes double the angle of rotation input through the speed reducer by the electric motor 76 (the angle of rotation of the rotation axis A, i.e., θ1). Therefore, the range of motion of the elbow joint 36 in the bending direction increases and the critical value of the driven speed (rotational speed) of the elbow joint 36 for the same input can be increased.

FIG. 8 referred to earlier shows the elbow joint 36 when θ1 is 30 degrees and θ2 is 19.2 degrees, so that θ1+θ2 is 49.2 degrees. FIG. 9 shows the elbow joint 36 when θ1 is 55 degrees and θ2 is 44 degrees, so that θ1+θ2 is 99 degrees.

The explanation of FIGS. 8 and 9 will be continued. Owing to the crossing arrangement of the first movable link 70 and second movable link 72, the amount of projection of the two movable links outward of the joint is small even when the amount of driving of the elbow joint 36 is large, so that there is little risk of the movable links 70, 72 coming into physical interference with the covers. Moreover, the likelihood of interference with the first cover 84 and second cover 86 can be reduced because the elbow joint 36 bends in two stages (due to the presence of two rotation axes (i.e., the rotation axis A and rotation axis C) acting as fulcrums).

Moreover, the S-like shape of the second movable link 72 prevents interference of the second movable link 72 with the rotation axis A and the rotation axis C to which the first movable link 70 is connected, when the elbow joint 36 is driven, so that the range of motion of the elbow joint 36 in the bending direction can be further expanded.

When the elbow joint 36 is driven (rotated), the first cover 84 and second cover 86 are displaced relative to each other to produce a gap therebetween (change the size of the gap). As explained above, however, the third cover 88 is slidably interposed between the first cover 84 and second cover 86, so that the gap can be covered by the third cover 88 to make the elbow joint 36 more resistant to dust and to improve safety of the elbow joint 36. Another effect or advantage is improved appearance of the robot 1.

Figure 13:
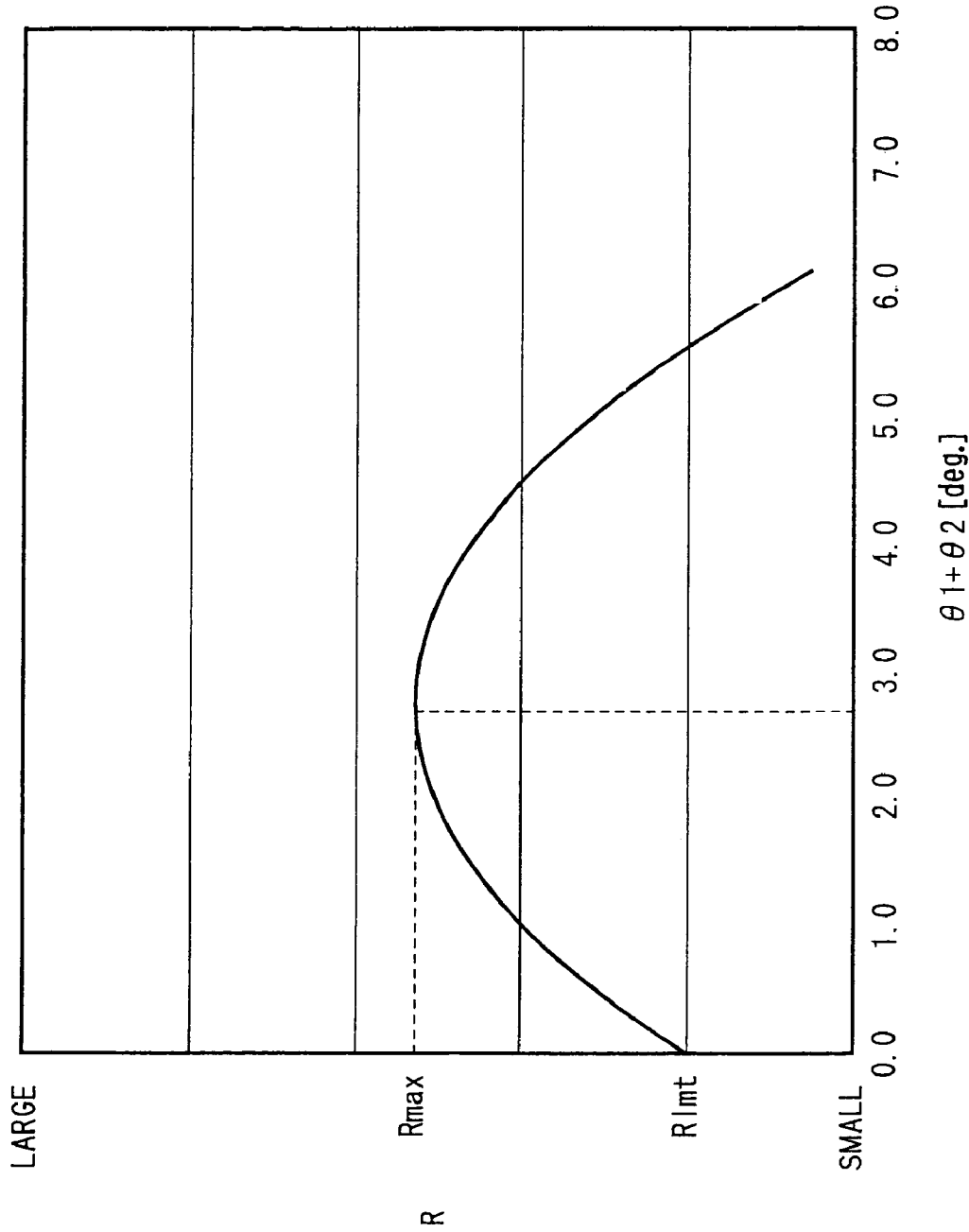
FIG. 13 is a graph showing the relationship of the straight-line distance R from the shoulder joint to the wrist joint of the robot shown in FIG. 3 and the driven angle $\theta 1+\theta 2$ of the elbow joint.

The singularity of the arm linkage 5 will be explained next. FIG. 13 is a graph showing the relationship of the straight-line distance (designated by R) from the shoulder joint 30, 32, 34 to the wrist joint 38 and the driven angle θ1+θ2 of the elbow joint 36. Note that θ1+θ2 being 0 degree in the graph means the state of the arm linkage 5 being fully extended (state of the elbow joint 36 being driven as far in the extending direction as the mechanism permits; this is designated by R1mt in the upper diagram of FIG. 14).

When the elbow joint 36 is driven in the bending direction from the state shown by the upper diagram of FIG. 14 (state of the elbow joint 36 being driven as far in the extending direction as the mechanism permits), the arm linkage 5 assumes the singularity posture in which the joints of the arm linkage 5 (shoulder joint, elbow joint, and wrist joint) are positioned on the same straight line. The straight-line distance R from the shoulder joint 30, 32, 34 to the wrist joint 38 is maximum at this time (designated Rmax in the middle diagram of FIG. 14).

When the robot assumes the singularity posture, the controlled variable of the position and posture control of the robot diverges or oscillates, so that of the total range within which the mechanism permits the angle of rotation to be determined (designated by θELm in the lower diagram of FIG. 14), only the range of angles of rotation that does not pass beyond the singularity posture (designated by θELc) can be utilized in control. In other words, of θ1+θ2, angles from 0 degree (R=R1mt) to the angle at which R becomes the maximum value Rmax are angles of rotation that cannot be utilized in control (designated by θELcerr).

As shown in FIG. 13, in this embodiment, R becomes the maximum value Rmax when θ1+θ2 is about 2.8 degrees, so that angles of rotation from 0 degree to 2.8 degrees cannot be utilized in control. This range is only about ¼ of that in the case of the ordinary conventional single-axis joints and is smaller. This is ascribable to the fact that the upper arm link 42 and forearm link 44 are connected through the two movable links, i.e., the first movable link 70 and the second movable link 72, and these two movable links 70 and 72 are arranged to cross, so that interference between the first cover 84 and second cover 86 is less likely to occur and no need to offset the rotation axes of the elbow joint 36 outward arises.

Thus, in the joint structure of the robot 1 according to this embodiment, the upper arm link 42 and forearm link 44 are connected through the two movable links (the first movable link 70 and second movable link 72) and the two movable links 70, and 72 are arranged to cross. As a result, the overall angle of rotation of the elbow joint 36 for a given input can be made larger, the range of motion of the elbow joint 36 in the bending direction increases, and the critical value of the driven speed (rotational speed) of the elbow joint 36 for the same input can be increased.

Moreover, the amount of outward projection of the two movable links 70, 72 can be made small, so that there is little risk of the movable links 70 and 72 coming into physical interference with the third cover 88 that covers them. Further, interference between the first cover 84 and the second cover 86 becomes unlikely because the elbow joint 36 bends over two stages with the two rotation axes A, C acting as fulcrums. As a result, the range of motion of the elbow joint 36 in the bending direction can be further expanded. In addition, the rotational axes of the elbow joint 36 do not have to be offset outward of the joint, so that reduction of the movable range of the elbow joint 36 in the direction of extension can be minimized.

Further, the second movable link 72 is given a curved shape, specifically the S-like shape, detouring the rotation axis A and rotation axis C, when the elbow joint 36 is driven, so that the second movable link 72 does not interfere with the rotation axis A and rotation axis C to which first movable link 70 is connected. As a result, the range of motion of the elbow joint 36 can be further expanded.

Moreover, since the third cover 88 is slidably interposed between the first cover 84 and second cover 86, the gap formed between the first cover 84 and second cover 86 occurring with rotation of the elbow joint 36 can be covered by the third cover 88. The elbow joint 36 can therefore be driven without exposing the internal structure of the joint, so that, in addition to realizing the foregoing effects or advantages, it is further possible to improve the dust resistance and safety of the elbow joint 36. In addition, the appearance of the robot 1 can be enhanced.

Although the foregoing explanation has been made taking the elbow joint 36 as an example joint, the robot joint structure according to this embodiment is also likewise suitable for the knee joints 16 and the like.

As shown in FIG. 12, the amount of increase in θ2 with increase in θ1 is maximum when θAB is set at or near 0 degree. Therefore, by setting θAB at or near 0 degree, i.e., by providing both the rotation axis A and the rotation axis B on or near the straight line (42x) lying perpendicular to the longitudinal direction of the upper arm link 42 (42z), it is possible to further expand that range of motion of the elbow joint 36 in the bending direction and also to increase the driven speed of the elbow joint 36 for the same input. However, owing to the fact that driving torque of the elbow joint 36 decreases in proportion as the amount of increase in θ2 with increase in θ1 becomes larger, θAB of course needs to be appropriately defined in accordance with the actuator used and/or the intended operation (task). In this embodiment, θAB is set at 30 degrees in order to achieve optimum balance among expansion of range of motion, enhancement of driven speed, and realization of driving torque.

Figure 15:
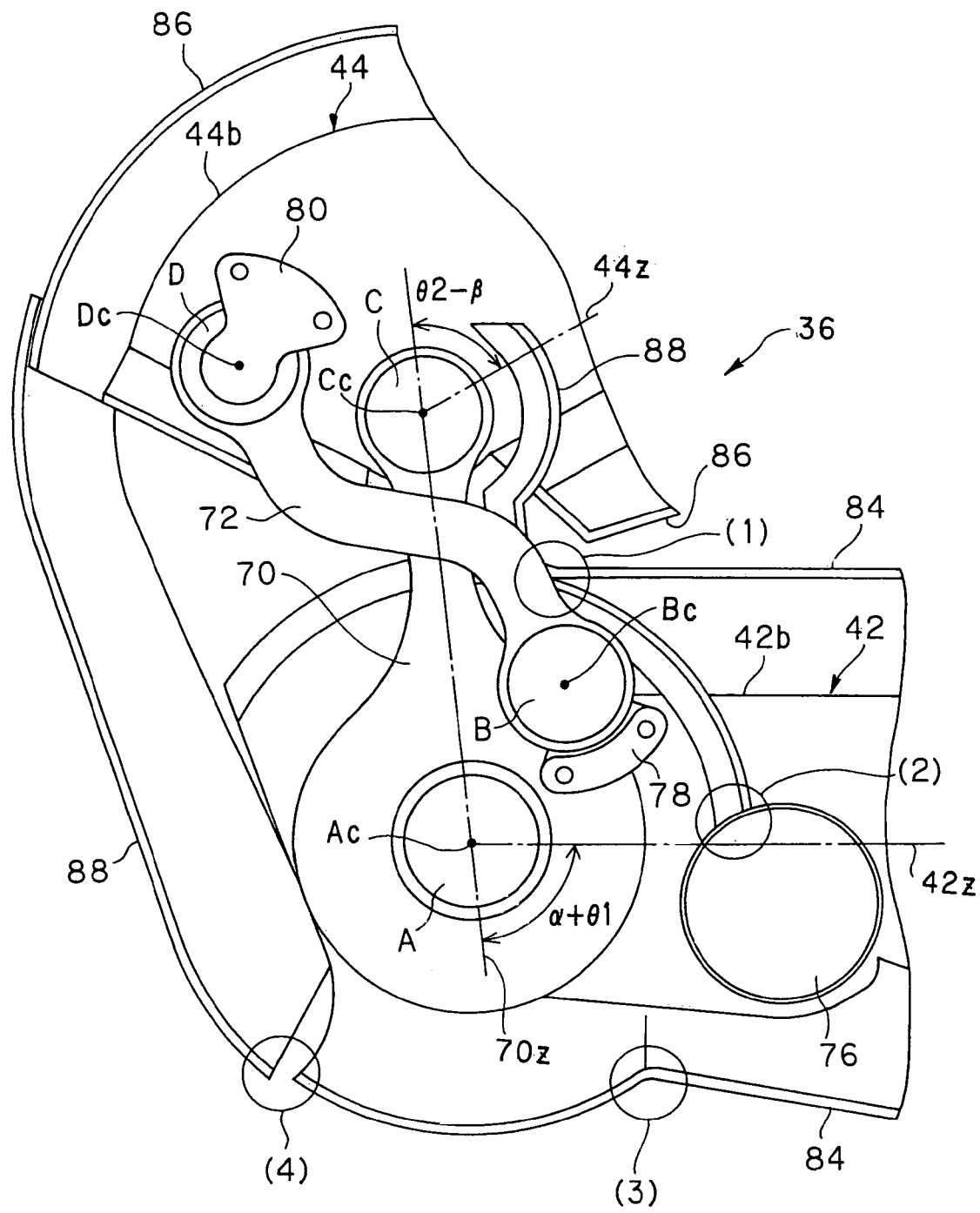
FIG. 15 is a plan view, similar to FIG. 8, but showing a driven state of the elbow joint shown in FIG. 7.

On the other hand, as shown in FIG. 15, owing to the aforesaid S-like shape of the second movable link 72 in this embodiment, when the amount of driving of the elbow joint 36 is large, the convex of the S-shaped second movable link 72 interferes with the first cover 84 (see encircled area (1) in the drawing). Although this interference can be eliminated by cutting away the edge of the first cover 84, doing so would make it necessary extend the edge of the third cover 88 in the upper arm direction so as to cover the resulting gap. If the edge of the third cover 88 should be extended in the upper arm direction, however, interference would arise with the electric motor 76 mounted on the upper arm when the amount of driving of the elbow joint 36 is large (shown by encircled area (2) in the drawing).

Although interference between the edge of the third cover 88 and the electric motor 76 can be eliminated by shifting the electric motor 76 downward, doing so would reduce the sliding distance of the third cover 88 because it would become impossible to form a concavity at the lower portion of the first cover 84 (shown by encircled area (3)). As a result, a gap would arise between the first cover 84 and third cover 88 when the amount of driving of the elbow joint 36 is large (shown by encircled area (4)). Note that FIG. 15 shows the elbow joint 36 when θ1 is 75 degrees and θ2 is 75 degrees, i.e., when θ1+θ2 is 150 degrees.

A second embodiment of the invention to be explained in the following is therefore configured to increase the range of motion of the joints while preventing interference between the links and covers.

A robot joint structure according to the second embodiment of the invention will now be explained.

Figure 16:
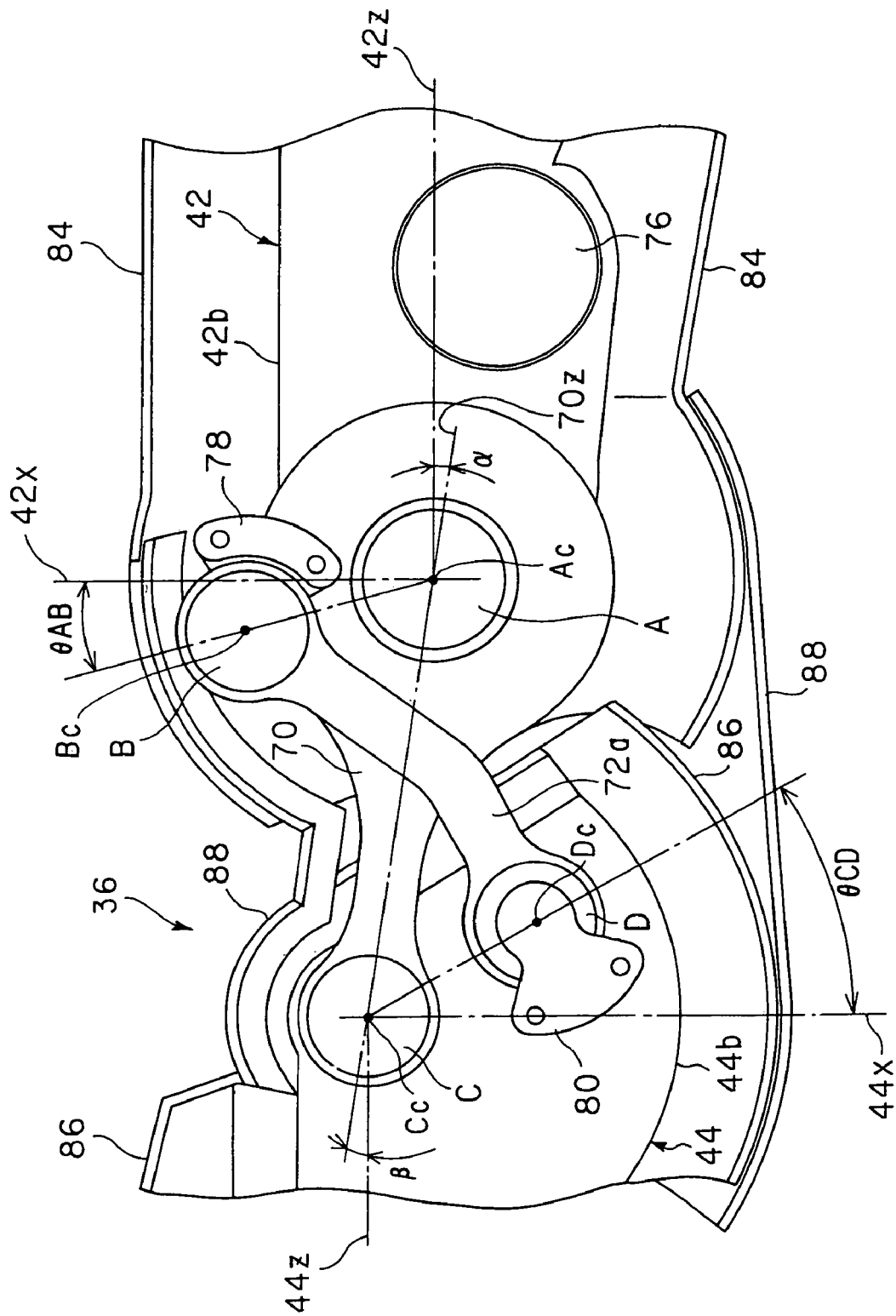
FIG. 16 is a plan view, similar to FIG. 7, but showing a robot joint structure according to a second embodiment of this invention.

FIG. 16 is a plan view, similar to FIG. 7, but showing a robot joint structure according to the second embodiment of the invention.

An explanation will be made focusing on the points of difference from the first embodiment. As illustrated, in the second embodiment a second movable link 72a is curved in the shape of an archery bow, θAB is defined as −15.5 degrees, and θCD is defined as 30 degrees.

Figure 17:
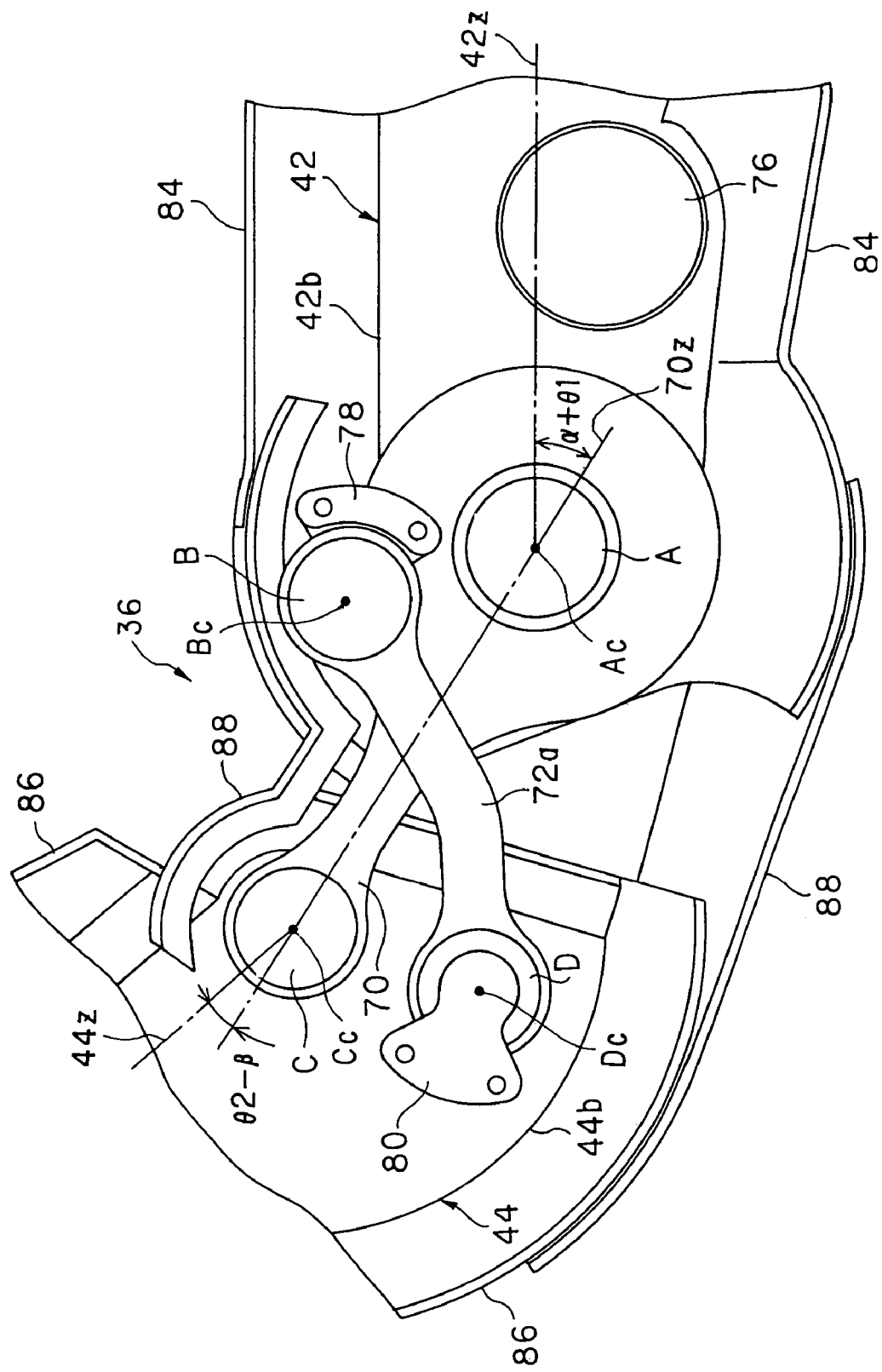
FIG. 17 is a plan view showing a driven state of the elbow joint shown in FIG. 16.
Figure 18:
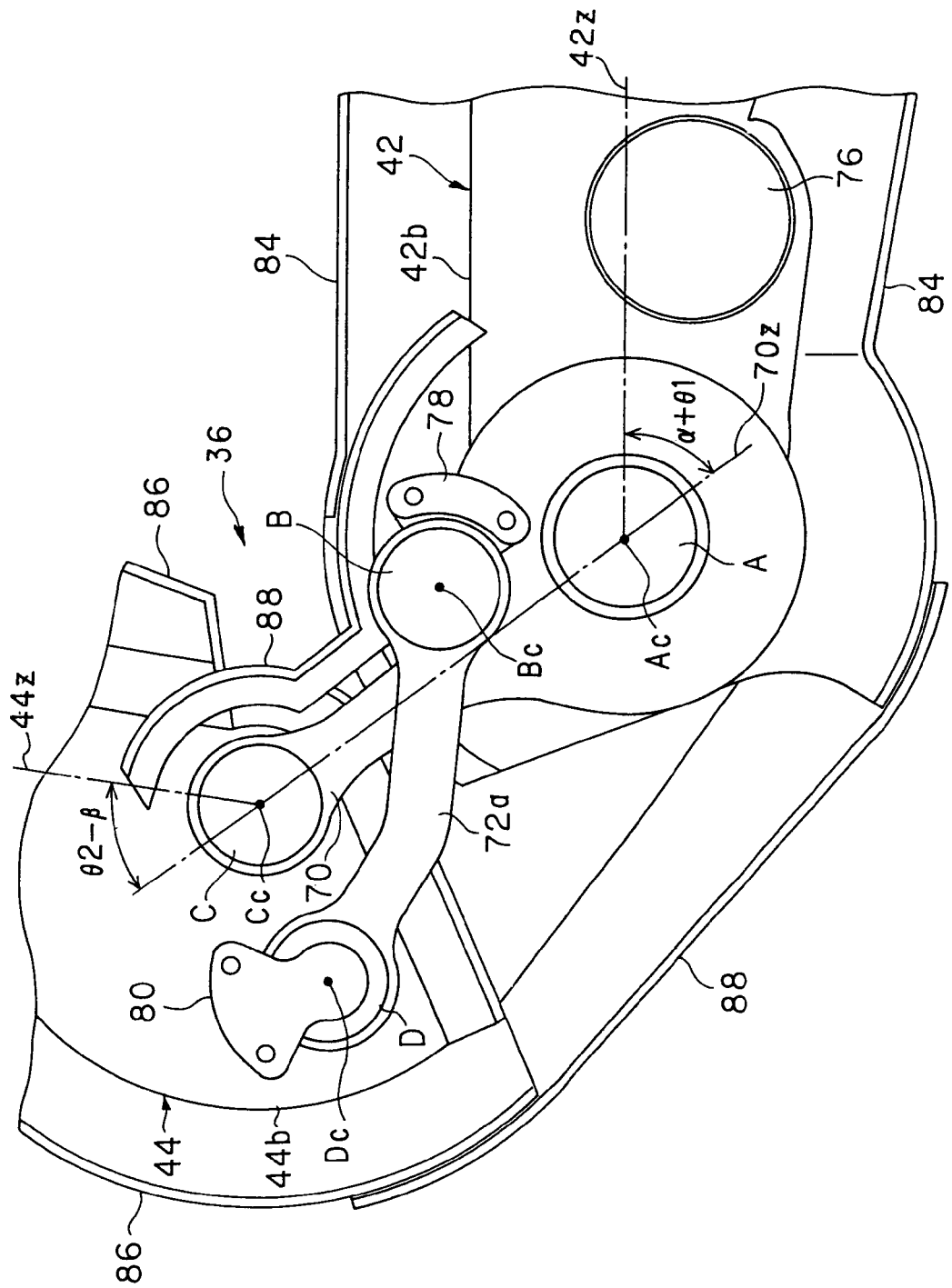
FIG. 18 is a plan view similar to FIG. 17 showing a driven state of the elbow joint shown in FIG. 16.
Figure 19:
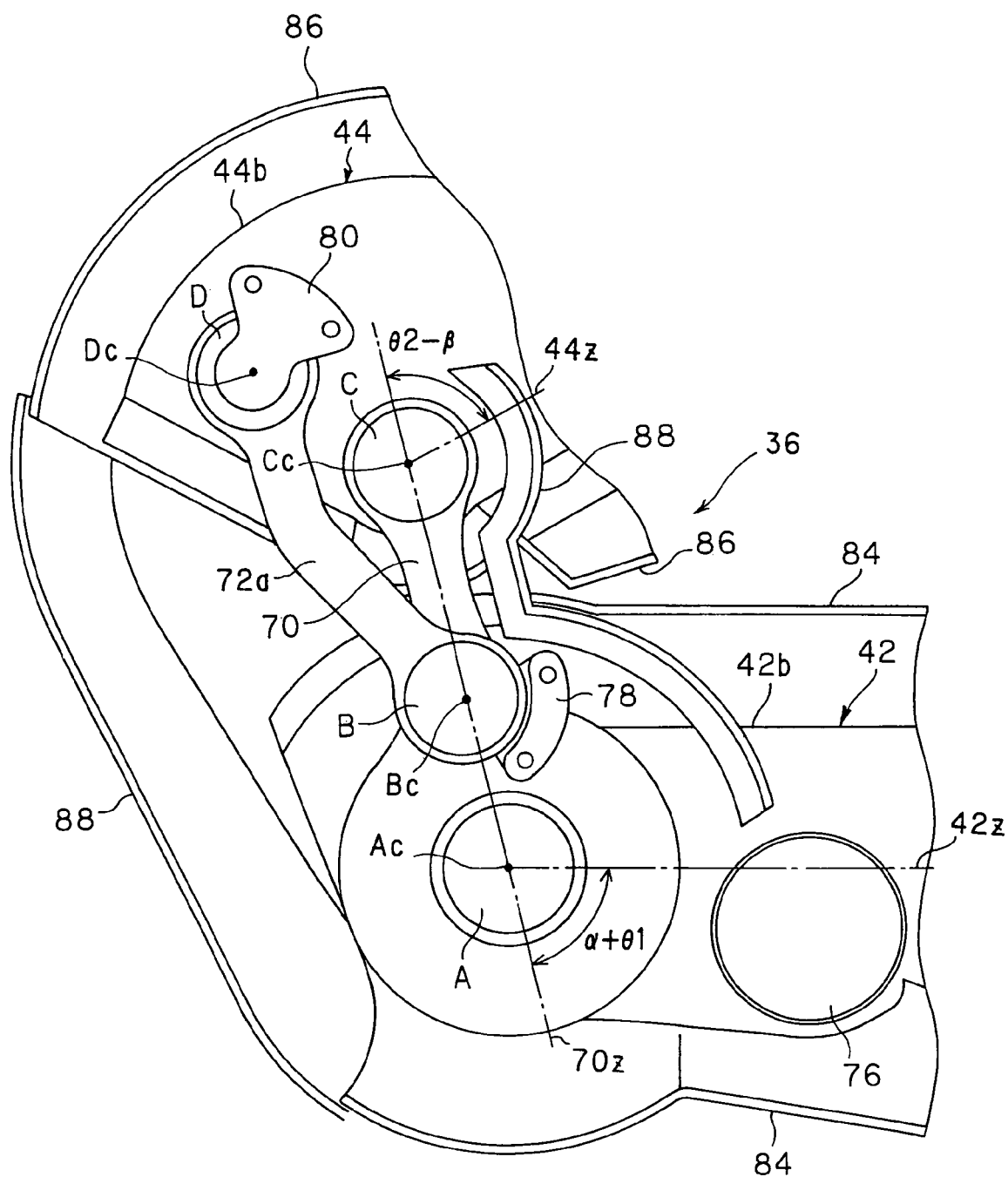
FIG. 19 is a plan view similar to FIG. 17 showing a driven state of the elbow joint shown in FIG. 16.

FIGS. 17 to 19 are plan views showing driven states of the elbow joint 36 shown in FIG. 16. Note that FIG. 17 shows the elbow joint 36 when θ1 is 24 degrees and θ2 is 25.7 degrees, i.e., when θ1+θ2 is 49.7 degrees, and FIG. 18 shows the elbow joint 36 when θ1 is 45 degrees and θ2 is 55 degrees, i.e., when θ1+θ2 is 100 degrees. FIG. 19 shows the elbow joint 36 when θ1 is 68 degrees and θ2 is 82.2 degrees, i.e., when θ1+θ2 is 150.2 degrees.

As mentioned above, when θAB is made −15.5 degrees, in other words, when the rotation axis B is provided toward the side of the forearm link 44 from the rotation axis A, the second movable link 72a does not interfere with the rotation axis A. Therefore, unlike in the first embodiment, there is no need to shape the second movable link 72a so as to project toward the first cover 84 (so as to detour the rotation axis A). As a result, as shown in FIGS. 17 to 19, the second movable link 72a does not interfere with the first cover 84 even when the amount of driving of the elbow joint 36 is large. Moreover, the second movable link 72a does not interfere with the rotation axis C even when the amount of driving of the elbow joint 36 is large, because the second movable link 72a is curved in the shape of the archery bow. Therefore, the range of motion of the elbow joint 36 in the bending direction can be expanded beyond that in the first embodiment.

Figure 20:
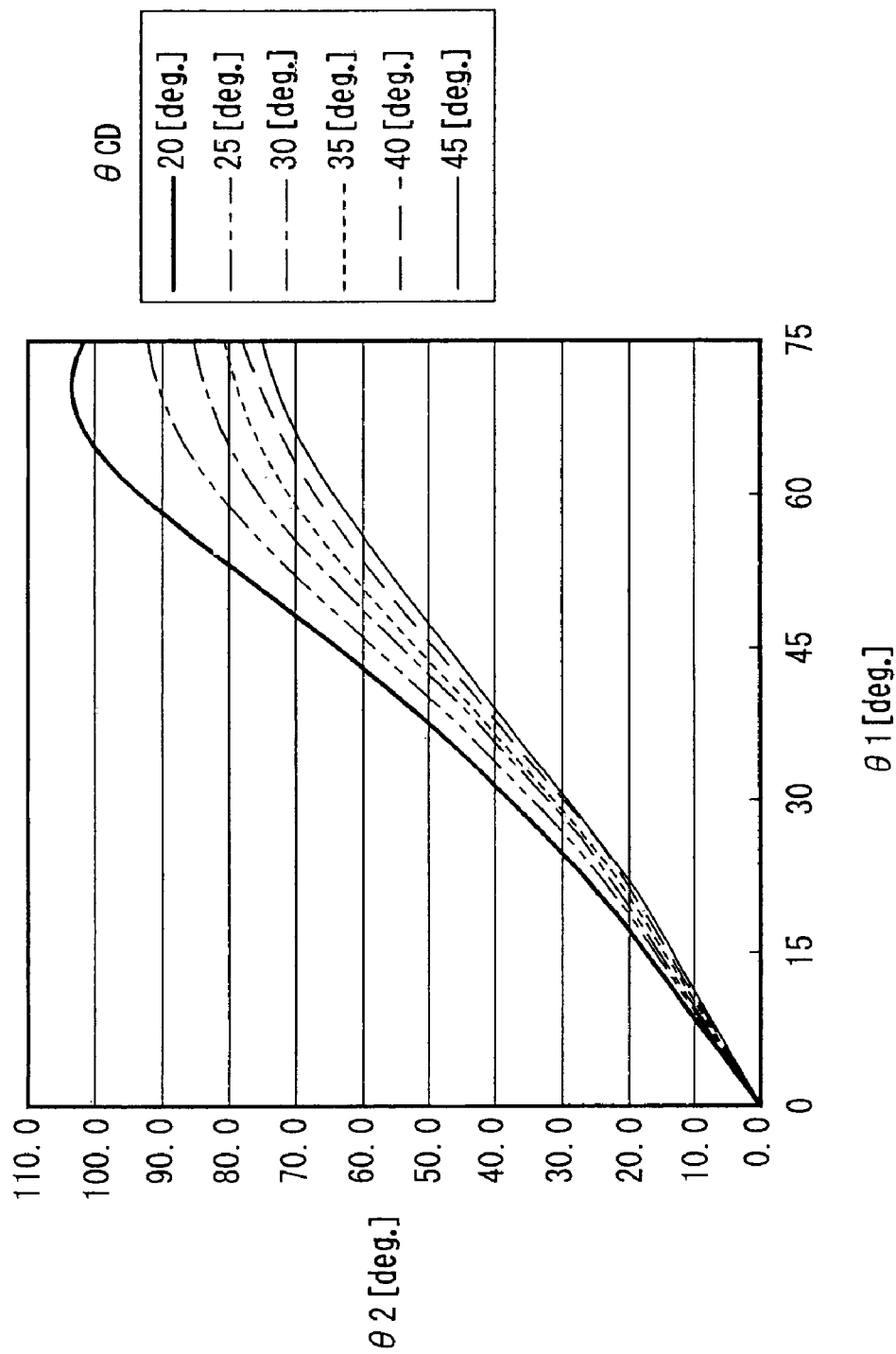
FIG. 20 is a graph showing how the relationship between $\theta 1$ and $\theta 2$ changes at different values of $\theta CD$ when $\theta AB$ is made −15.5 degrees in the elbow joint of FIG. 16.

FIG. 20 is a graph showing how the relationship between θ1 and θ2 changes at different values of θCD when θAB is made −15.5 degrees. From the graph it can be seen that when θAB is made −15.5 degrees and θCD is made 30 degrees, θ2 increases at the rate of one-to-one substantially in proportion to increase in θ1. In other words, the output angle of rotation (overall angle of rotation of the elbow joint 36, i.e., θ1+θ2) becomes double the angle of rotation inputted through the speed reducer by the electric motor 76 (the angle of rotation of the rotation axis A, i.e., θ1) or more. Therefore, the range of motion of the elbow joint 36 in the bending direction can be increased beyond that in the first embodiment and the critical value of the driven speed (rotational speed) of the elbow joint 36 for the same input can be increased.

As shown by the graph, the amount of increase in θ2 with increase in θ1 increases in proportion as θCD is made smaller. Therefore, by setting θCD at or near 0 degree, i.e., by providing both the rotation axis C and the rotation axis D on or near the straight line (44x) lying perpendicular to the longitudinal direction of the forearm link 44 (44z), it is possible to further expand that range of motion of the elbow joint 36 in the bending direction and also to increase the driven speed of the elbow joint 36 for the same input. However, owing to the fact that the driving torque of the elbow joint 36 decreases in proportion as the amount of increase in θ2 with increase in θ1 becomes larger, θCD needs to be appropriately defined in accordance with the actuator used and/or the intended operation (task), similarly to what has been explained earlier. In this embodiment, θCD is set at 30 degrees in order to achieve optimum balance among expansion of range of motion, enhancement of driven speed, and realization of driving torque.

Thus, in the robot joint structure according to the second embodiment, the second movable link 72a is formed in the shape of the archery bow, so that when the elbow joint 36 is driven, the second movable link 72a does not interfere with the first cover 84 and rotation axis C. As a result, the range of motion of the elbow joint 36 can be further expanded.

Moreover, owing to the fact that θAB is set at −15.5 degrees and θCD is set at 30 degrees, the range of motion of the elbow joint 36 can be expanded beyond that in the first embodiment and the critical value of the driven speed (rotational speed) of the elbow joint 36 for the same input can be increased.

Figure 21:
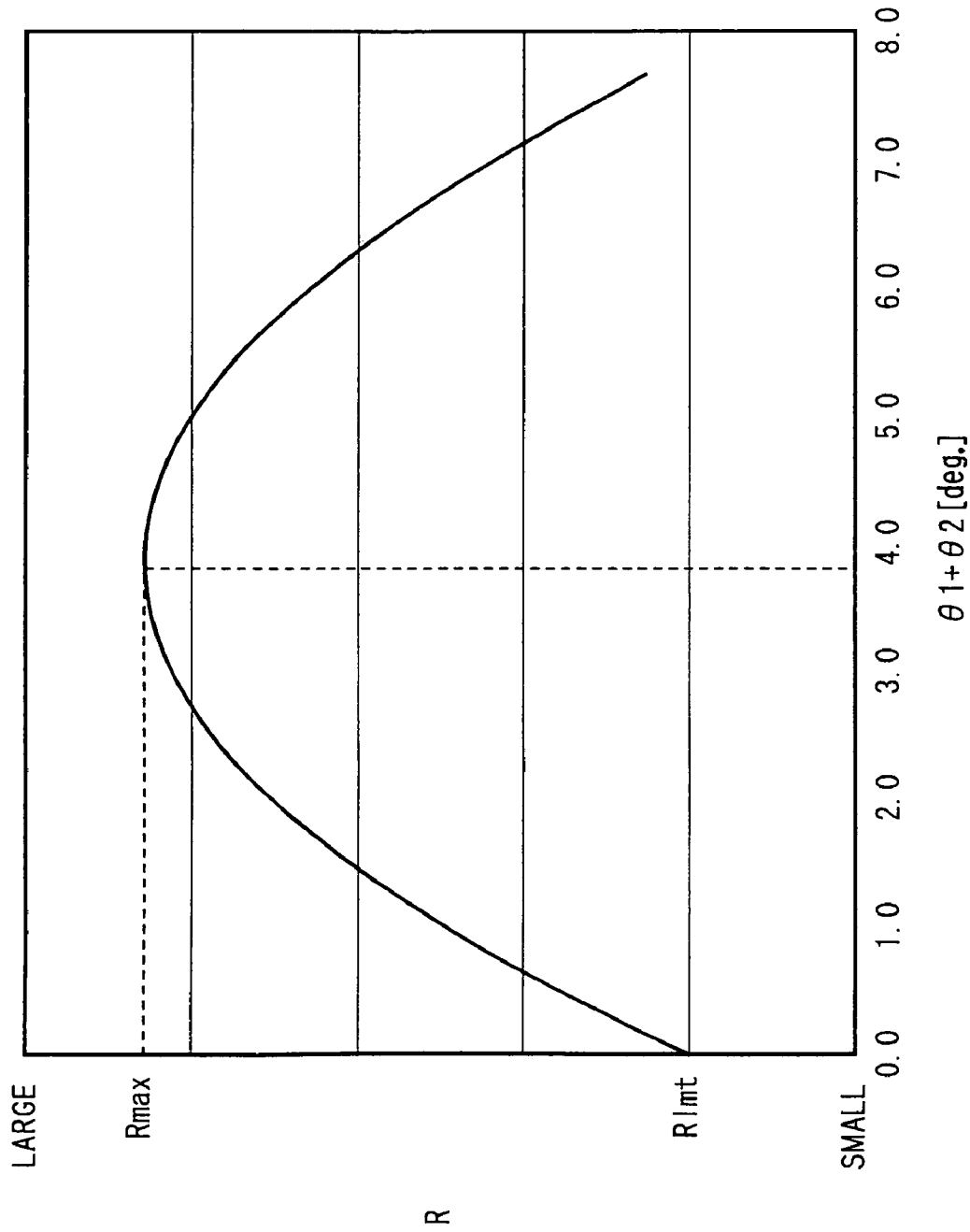
FIG. 21 is a graph, similar to that of FIG. 13, but relating to the second embodiment.

Further, as shown in FIG. 21, in this embodiment, R becomes the maximum value Rmax when θ1+θ2 is about 3.9 degrees, so that angles of rotation from 0 degree to 3.9 degrees cannot be utilized in control. This range is only about ⅓ of that in the case of the ordinary conventional single-axial joint and is smaller. Therefore, as in the first embodiment, reduction of the movable range of the elbow joint 36 in the direction of extension attributable to the singularity can be minimized.

Other structural features of the second embodiment are similar to those of the first embodiment and will not be explained again.

A robot joint structure according to a third embodiment of the invention will be explained next.

Figure 22:
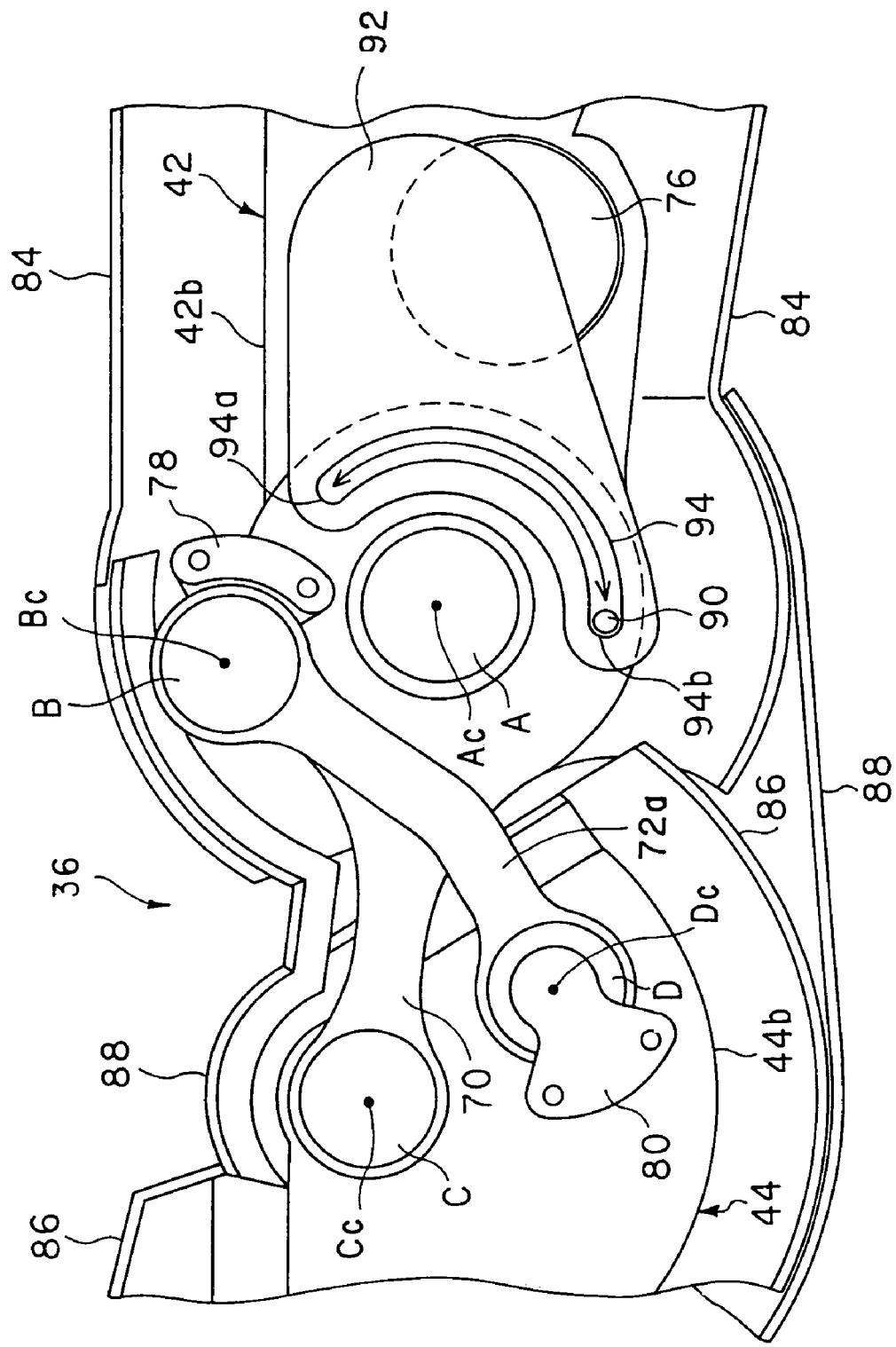
FIG. 22 is a plan view, similar to FIG. 16, but showing a robot joint structure according to a third embodiment of this invention.
Figure 23:
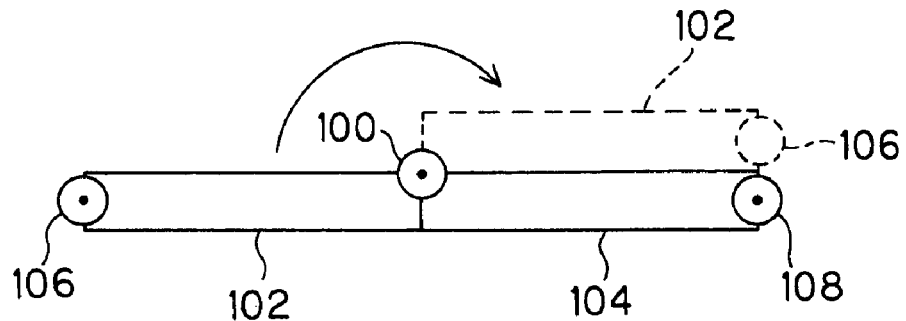
FIG. 23 is an explanatory view showing a conventional robot joint structure.
Figure 24:
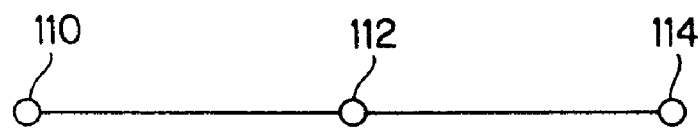
FIG. 24 is an explanatory view showing a singularity of an articulated robot.
Figure 25:
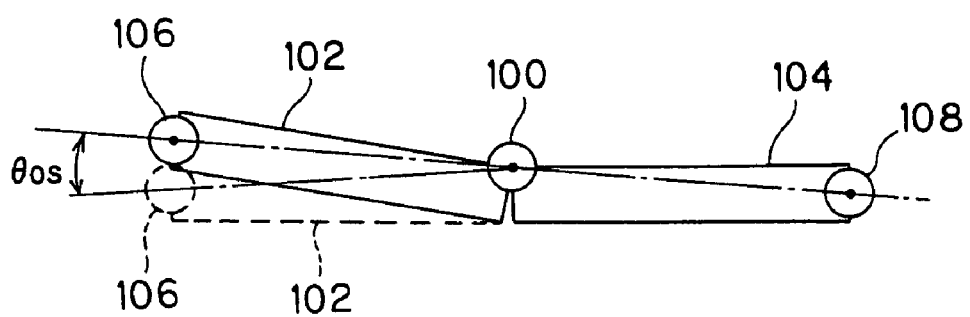
FIG. 25 is an explanatory view showing a problem of the joint structure in a conventional robot.

FIG. 22 is a plan view similar to FIG. 16 showing a robot joint structure according to the third embodiment of the invention.

An explanation will be made focusing on the points of difference from the first and second embodiments. In the third embodiment, the joint structure is provided with a mechanical over-rotation prevention mechanism for prevention over-rotation (excessive driving) of the elbow joint 36.

As shown in FIG. 22, a pin 90 is provided on the first movable link 70 such that the pin 90 is inserted into an arcuate hole 94 formed in a stopper 92. The stopper 92 is fastened to the upper arm first plate 42a (not shown).

The hole 94 is formed to have the same arcuate shape as the locus the pin 90 describes when the first movable link 70 is driven. One terminal end 94a of the hole 94 is defined so that, when the elbow joint 36 is driven, the rotation of the first movable link 70 terminates at a location where interference with the first cover 84 and second cover 86 does not occur. The other terminal end 94b thereof is defined so that θ1+θ2 does not become an angle at which the arm linkage 5 assumes the singularity posture. That is, it is defined in the first embodiment so that θ1+θ2 does not become 2.8 degrees or less and is defined in the second embodiment so that θ1+θ2 does not become 3.9 degrees or less.

This arrangement prevents over-rotation of the first movable link 70, thereby preventing over-rotation of the elbow joint 36 to preclude interference with and damage to the first cover 84 and second cover 86 and also preventing the arm linkage 5 from assuming the singularity posture.

Other structural features and effects of the third embodiment are similar to those of the first and second embodiments and will not be explained again.

As stated above, the first to third embodiments are configured to have a joint structure of robot (elbow joint 36) having a first main link (upper arm link 42) and a second main link (forearm link 44) connected through a first movable link (70) and a second movable link (72, 72a), and an actuator (electric motor 76) installed on the first main link and driving the first movable link (70) such that the first main link and the second main link are displaced relative to each other; characterized in that: rotation axes A and B each provided at the first main link; and rotation axes C and D each provided at the second main link; wherein in a quadrangle whose apices are formed by the rotation axes A, B, C and D, when assuming that rotation axes that are diagonally opposed to each other are A and C, while those that are diagonally opposed to each other are B and D, the rotation axes A and C are connected through the first movable link (70) and the rotation axes B and D are connected through the second movable link (72, 72a) in such a manner that the first movable link (70) and the second movable link (72, 72a) are disposed to cross and that the rotation axis A is driven by the actuator to drive the first movable link, such that the first main link and the second main link are displaced relative to each other.

In the joint structure, the rotation axis A and the rotation axis B are provided on or near a same straight line (42x) lying perpendicular to a longitudinal direction (42z) of the first main link.

In the joint structure, the rotation axis C and the rotation axis D are provided on or near a same straight line (44x) lying perpendicular to a longitudinal direction (44z) of the second main link.

In the joint structure, at least one of the first main link (70) and the second main link (72, 72a) is given a curved shape (S-like shape or shape of an archery bow), so as not to interfere with the rotation axes of the other of the first main link and the second main link.

In the joint structure, at least one of the first movable link (70) and the second movable link (72, 72a) is provided with an over-rotation prevention mechanism (pin 90, stopper 92, hole 94) that prevents the joint from over-rotating beyond predetermined angles.

In the joint structure, the joint is provided with covers covering the first main link, the first movable link (70), the second movable link (72, 72a), the second main link and the actuator from outside, the covers comprising: a first cover (84) covering the first main link and the actuator; a second cover (86) covering the second main link; and a third cover (88) slidably interposed between the first cover (84) and the second cover (86), and covering the first and second movable links (70, 72, 72a) and a gap formed between the first and second covers (84, 86) occurring with rotation of the joint.

Although the robot joint structure according to this invention has been explained in the foregoing taking a legged mobile robot, more specifically a humanoid robot, as an example, this invention is also suitable for application to other types of mobile robots and industrial robots.

Moreover, the actuator used is not limited to the electric motor but can be another type of actuator.

Further, θAB and θCD are not limited to the aforesaid concrete examples but should of course be set at appropriate values in accordance with the intended operation (task) to be performed by the robot.

Further, although it has been explained that, of the first movable link 70 and second movable link 72 (72a), only the second movable link 72 (72a) is curved so as not to interfere with the rotation axis A and rotation axis C, the first movable link 70 can also be curved so as not to interfere with the rotation axis B and rotation axis D. Needless to say, the shape of the curve is not limited to the illustrated examples.

INDUSTRIAL APPLICABILITY

In this invention, a robot joint structure is provided wherein the first main link (e.g., the upper arm link) and the second main link (e.g., the forearm link) are connected through the first movable link and the second movable link, and the two movable links are arranged to cross. This structure makes it possible to increase the overall driven angle of the joint (e.g., an elbow joint) relative to the input, expand the range of motion of the joint in the bending direction, and also raise the critical value of the driven speed (rotational speed).

In addition, the amount of outward projection of the two movable links is small, so that there is little risk of the movable links and the covers coming into physical interference. Further, interference with the cover covering the first main link and the cover covering the second main link becomes unlikely because the joint bends over two stages with the two rotation axes acting as fulcrums. As a result, the range of motion of the joint in the bending direction can be further expanded. Moreover, the rotational axes of the elbow joint do not have to be offset outward of the joint, so that reduction of the movable range of the joint in the direction of extension attributable to the singularity can be minimized.

The invention claimed is:

1. A robot joint structure having a first main link and a second main link connected through a first movable link and a second movable link, and an actuator installed on the first main link and driving the first movable link such that the first main link and the second main link are displaced relative to each other;

wherein the improvement comprises:

rotation axes A and B each provided at the first main link;

rotation axes C and D each provided at the second main link, the rotation axes A, B, C and D forming apices of a quadrangle, and when assuming that rotation axes that are diagonally opposed to each other are A and C, while those that are diagonally opposed to each other are B and D, the rotation axes A and C are connected through the first movable link and the rotation axes B and D are connected through the second movable link such that the first movable link and the second movable link are disposed to cross and that the rotation axis A is driven by the actuator to drive the first movable link, such that the first main link and the second main link are displaced relative to each other, a first plate; and a second plate installed in parallel with the first plate, the first and second plates constituting the first main link, such that the first movable link is rotatably connected to the first plate and the second plate through the rotation axis A, while the second movable link is rotatably connected to the first plate through the rotation axis B.

2. The robot joint structure according to claim 1, wherein the rotation axis A and the rotation axis B are provided on or near a straight line in parallel with a line lying perpendicular to a longitudinal direction of the first main link.

3. The robot joint structure according to claim 2, wherein the rotation axis C and the rotation axis D are provided on or near a straight line in parallel with a line lying perpendicular to a longitudinal direction of the second main link.

4. The robot joint structure according to claim 1, wherein the rotation axis C and the rotation axis D are provided on or near a straight line in parallel with a line lying perpendicular to a longitudinal direction of the second main link.

5. The robot joint structure according to claim 1, wherein at least one of the first movable link and the second movable link is given a curved shape, so as not to interfere with the rotation axes of the other of the first movable link and the second movable link.

6. The robot joint structure according to claim 1, wherein at least one of the first movable link and the second movable link is provided with an over-rotation prevention mechanism that prevents the joint from over-rotating beyond predetermined angles.

7. The robot joint structure according to claim 1, wherein the joint is provided with covers covering the first main link, the first movable link, the second movable link, the second main link and the actuator from outside, the covers comprising:

a first cover covering the first main link and the actuator;

a second cover covering the second main link; and a third cover slidably interposed between the first cover and the second cover, and covering the first and second movable links and a gap formed between the first and second covers occurring with rotation of the joint.

* * * * *